US00RE48967E

(19) United States
(12) Reissued Patent
Buckley et al.

(10) Patent Number: US RE48,967 E
(45) Date of Reissued Patent: *Mar. 8, 2022

(54) SYSTEM AND METHOD FOR ORIGINATING A CALL VIA A CIRCUIT-SWITCHED NETWORK FROM A USER EQUIPMENT DEVICE

(71) Applicant: BlackBerry Limited, Waterloo (CA)

(72) Inventors: Adrian Buckley, Tracy, CA (US); Jan Hendrik Lucas Bakker, Keller, TX (US)

(73) Assignee: BlackBerry Limited, Waterloo (CA)

( * ) Notice: This patent is subject to a terminal disclaimer.

(21) Appl. No.: 15/467,640

(22) Filed: Mar. 23, 2017

Related U.S. Patent Documents

Reissue of:
(64) Patent No.: 8,989,179
Issued: Mar. 24, 2015
Appl. No.: 13/726,777
Filed: Dec. 26, 2012

U.S. Applications:
(63) Continuation of application No. 12/732,041, filed on Mar. 25, 2010, now Pat. No. 8,369,319, which is a
(Continued)

(51) Int. Cl.
*H04L 12/66* (2006.01)
*H04M 7/00* (2006.01)
(Continued)

(52) U.S. Cl.
CPC ..... *H04M 7/0075* (2013.01); *H04L 12/66* (2013.01); *H04L 65/1069* (2013.01); *H04W 8/26* (2013.01);
(Continued)

(58) Field of Classification Search
CPC . H04L 12/66; H04L 65/1069; H04L 65/1016; H04L 65/1006; H04W 8/26;
(Continued)

(56) References Cited

U.S. PATENT DOCUMENTS 7,710,950 B2 5/2010 Buckley et al.
2002/0184302 A1 12/2002 Prueitt et al.
(Continued)

FOREIGN PATENT DOCUMENTS

EP 1811745 7/2007
EP 2367335 9/2011
(Continued)

OTHER PUBLICATIONS

Oxley, D. et al.; "Techniques To Support VoIP Using WAP in a 2G and GPRS in 2.5G Networks"; 5 pages.
(Continued)

*Primary Examiner* — Mark Sager
(74) *Attorney, Agent, or Firm* — Fish & Richardson P.C.

(57) ABSTRACT

In one aspect, an application server (AS) node comprises a processor configured to receive a first SIP Invite request from the UE device, the first SIP Invite request having call information which includes a URI of a called party and data indicating that the first SIP Invite request is for a bearer over a circuit-switched (CS) network. An E.164 number is associated with the call information in the first SIP Invite request and a SIP response including the E.164 number is sent to the UE device in response to receiving the first SIP Invite request. When a call setup message including the E.164 number received from the CS network, the received E.164 number is verified if it is valid and if so, the call information is identified based on the E.164 number and is sent to the called party via a second SIP Invite request.

16 Claims, 5 Drawing Sheets

Related U.S. Application Data continuation of application No. 11/740,102, filed on Apr. 25, 2007, now Pat. No. 7,710,950, which is a continuation-in-part of application No. 11/542,462, filed on Oct. 3, 2006, now Pat. No. 7,995,565, which is a continuation of application No. 11/347,874, filed on Feb. 6, 2006, now Pat. No. 7,830,868.

(51) Int. Cl.

| | |
|---|---|
| ***H04W 76/12*** | (2018.01) |
| ***H04L 65/1069*** | (2022.01) |
| ***H04W 8/26*** | (2009.01) |
| *H04W 76/11* | (2018.01) |
| *H04L 65/10* | (2022.01) |
| *H04W 80/10* | (2009.01) |
| *H04L 65/1016* | (2022.01) |

(52) U.S. Cl.
CPC ..... *H04W 76/12* (2018.02); *H04L 65/1006* (2013.01); *H04L 65/1016* (2013.01); *H04W 76/11* (2018.02); *H04W 80/10* (2013.01)

(58) Field of Classification Search
CPC ..... H04W 76/12; H04W 80/10; H04W 76/11; H04M 7/0075
USPC ..... 470/353, 354, 355
See application file for complete search history.

(56) References Cited

U.S. PATENT DOCUMENTS

| | | | |
|---|---|---|---|
| 2004/0028052 | A1 | 2/2004 | Chen et al. |
| 2004/0096042 | A1 | 5/2004 | Orwick et al. |
| 2004/0137918 | A1 | 7/2004 | Varonen et al. |
| 2004/0184435 | A1 | 9/2004 | Westman |
| 2004/0203680 | A1 | 10/2004 | Sylvain |
| 2004/0235483 | A1 | 11/2004 | Sylvain |
| 2005/0058125 | A1 | 3/2005 | Mutikainen et al. |
| 2005/0130657 | A1 | 6/2005 | Creamer et al. |
| 2005/0170837 | A1 | 8/2005 | Halsell |
| 2005/0195762 | A1 | 9/2005 | Longoni et al. |
| 2005/0233727 | A1 | 10/2005 | Poikselka et al. |
| 2006/0003754 | A1 | 1/2006 | Robison et al. |
| 2006/0209805 | A1 | 9/2006 | Mahdi et al. |
| 2006/0268900 | A1 | 11/2006 | Larsson et al. |
| 2006/0280169 | A1 | 12/2006 | Mahdi |
| 2007/0002831 | A1 | 1/2007 | Allen et al. |
| 2007/0014281 | A1 | 1/2007 | Kant |
| 2007/0041367 | A1 | 2/2007 | Mahdi |
| 2007/0049281 | A1 | 3/2007 | Chen et al. |
| 2007/0058788 | A1 | 3/2007 | Mahdi et al. |
| 2007/0060097 | A1 | 3/2007 | Edge et al. |
| 2007/0064886 | A1 | 3/2007 | Chiu et al. |
| 2007/0065886 | A1 | 3/2007 | Bowen et al. |
| 2007/0091898 | A1 | 4/2007 | Rengaraju |
| 2007/0165612 | A1 | 7/2007 | Buckley |
| 2007/0183410 | A1 | 8/2007 | Song |
| 2007/0254625 | A1 | 11/2007 | Edge |
| 2008/0008157 | A1 | 1/2008 | Edge et al. |
| 2008/0318565 | A1 | 12/2008 | Stojanovski et al. |
| 2009/0210524 | A1 | 8/2009 | McCormack et al. |
| 2011/0213860 | A1 | 9/2011 | Ezerzer et al. |
| 2012/0137009 | A1 | 5/2012 | Crandell et al. |

FOREIGN PATENT DOCUMENTS

| | | |
|---|---|---|
| JP | 2004-343440 | 12/2004 |
| JP | 200527119 | 1/2005 |
| JP | 2006222822 | 8/2006 |
| KR | 10-2006-0114349 | 11/2006 |
| TW | 251406 | 7/1995 |
| TW | 200408256 | 5/2004 |
| WO | 2004068261 | 8/2004 |
| WO | 2006038839 | 4/2006 |
| WO | 2006045706 | 5/2006 |
| WO | 2006059928 | 6/2006 |
| WO | 2006095994 | 9/2006 |
| WO | 2006138019 | 12/2006 |

OTHER PUBLICATIONS

3GPP TSG-SA2 Meeting #55; Busan, South Korea; Oct. 23-27, 2006; pp. 1 through 7.
3rd Generation Partnership Project; Technical Specification Group Services and System Aspects; Voice Call Continuity between CS and IMS; Stage 2 (Release 7); Aug. 2006; 41 pages.
3rd Generation Partnership Project; Technical Specification Group Services and System Aspects; Voice Call Continuity (VCC) between Circuity Switched (CS) and IP Multimedia Subsystem (IMS); Stage 2 (Release 7); Jun. 2007; 36 pages.
T. Alexiou et al.; "The SIP ALLOCATE Method"; SIPPING Working Group; Feb. 2002; pp. 1-9.
"3rd Generation Partnership Project; Technical Specification Group Services and System Aspects; Voice Call Continuity between CS and IMS Study (Release 7)"; Global System for Mobile Communications; Dec. 2005; 153 Pages.
Digital cellular telecommunications system (Phase 2+); Numbering, addressing and identification (3GPP TS 03.03 version 5.5.0 Release 1996); Global System for Mobile Communications; Sep. 2003; 22 pages.
3GPP TS 24.206, "Voice Call Continuity between the Circuit-Switched (CS) Domain and the IP Multimedia (IP) Core Network (CN) Subsystem," Stage 3 (Release 7), Sep. 2006, 96 pgs.
Siemens AG, "Interworking Between the IMS Messaging Services and SMS and MMS," Sep. 16, 2006, 4 pgs.
3GPP TSG-SA2, Meeting #55, Change Request, "Use of SIP 380 Alternative Service to Support Dynamic VDNs," Oct. 18, 2006, 7 pgs.
Examiner's First Report for Application No. 2007221785; Australian Government, IP Australia; dated Jan. 29, 2009; 2 pages.
Australian Examiner's First Report, Application No. 2007200330, Australian Government IP Australia, dated Jul. 19, 2010, 2 pgs.
Australian Examiner's Second Report, Application No. 2007200056, Australian Government IP Australia, dated Jun. 2, 2010, 2 pgs.
AU Notice of Acceptance, Application No. 2007200056, IP Australia, dated Oct. 27, 2010, 3 pgs.
AU Notice of Acceptance, Application No. 2007221777, IP Australia, dated Oct. 14, 2010, 3 pgs.
IP Australia, Notice of Acceptance, Application No. 2007/200,330, dated Jul. 29, 2011, 3 pgs.
Canadian Office Action; Application No. 2,573,433; Canadian Intellectual Property Office; dated Apr. 15, 2010; 5 pgs.
CA Office Action, Application No. 2,596,774, Canadian IPO, dated Dec. 14, 2010, 10 pgs.
CIPO, Office Action, Application No. 2,605,098, dated Mar. 4, 2011, 4 pgs.
CIPO, Office Action, Application No. 2,605,102, dated Mar. 3, 2011,4 pgs.
CIPO, Notice of Allowance, Application No. 2,596,774, dated Aug. 31, 2011, 1 pg.
CIPO, Notice of Allowance, Application No. 2,576,877, dated Nov. 4, 2011, 1 pg.
CIPO, Notice of Allowance, Application No. 2,605,098, dated Dec. 13, 2011, 1 pg.
CIPO, Office Action, Application No. 2,605,102, dated Nov. 3, 2011, 2 pgs.
CIPO, Office Action, Application No. 2,683,989, dated May 10, 2012, 2 pgs.
CIPO, Office Action, Application No. 2,576,877, dated Nov. 17, 2010, 5 pgs.
CIPO, Office Action, Application No. 2,605,102, dated Nov. 21, 2012, 3 pgs.
CIPO, Notice of Allowance, Application No. 2,605,102, dated Mar. 27, 2013, 1 pg.

(56) References Cited

OTHER PUBLICATIONS

CIPO, Office Action, Application No. 2,683,989, dated Aug. 8, 2013, 3 pgs.
CIPO, Office Action, Application No. 2,683,989, dated Jul. 7, 2014, 3 pgs.
China Office Action. Application No. 200710007388.8; Republic of China; dated Oct. 30, 2009; 9 pages.
Chinese Office Action; Application No. 200710152676.2; State Intellectual Property Office of People's Republic of China; dated Mar. 29, 2010; 3 pgs.
Chinese Office Action, Application No. 200710194436.9, State Intellectual Property Office of People's Republic of China, dated Jun. 2, 2010, 8 pgs.
Chinese Office Action, Application No. 200710007388.8, State Intellectual Property Office of People's Republic of China, dated May 12, 2010, 3 pgs.
Chinese Office Action, Application No. 200710162407.4, State Intellectual Property Office of People's Republic of China, dated Jun. 11, 2010, 4 pgs.
CN Office Action, Application No. 200710002106.5, Chinese IPO, dated Jan. 10, 2011, 2 pgs.
SIPO, Second Office Action, Application No. 200710152676.2, dated Oct. 27, 2011, 3pgs.
SIPO, Second Office Action, Application No. 200710162407.4, dated Dec. 16, 2011, 2 pgs.
SIPO, Second Office Action, Application No. 200710194436.9, dated Dec. 23, 2011, 3 pgs.
SIPO, Office Action, Application No. 200710152676.2, dated Jun. 4, 2012, 4 pgs.
SIPO, Office Action, Application No. 200710162407.4, dated Jun. 26, 2012, 5 pgs.
SIPO, 3rd Office Action, Application No. 200710194436.9, dated Jul. 20, 2012, 2 pgs.
SIPO, Rejection Decision, Application No. 200710152676.2, dated Sep. 29, 2012, 2 Pgs.
SIPO, Rejection Decision, Application No. 200710162407.4, dated Oct. 9, 2012, 6 pgs.
SIPO, Notification of Grant of Rights for Invention Patent, Application No. 200710194436.9, dated Jan. 4, 2013, 2 pgs.
SIPO, First Office Action, Application No. 201010289690.9, dated Jan. 16, 2013, 2 pgs.
SIPO, First Office Action, Application No. 201110097656.6, dated May 6, 2013, 3 pgs.
SIPO, First Office Action, Application No. 200710002106.5, dated Dec. 11, 2009, 9 pgs.
SIPO, Second Office Action, Application No. 201010289690.9, dated Sep. 6, 2013, 9 pgs.
CIPO, Office Action, Application No. 201110097656.6, dated Nov. 2013, 3 pgs.
SIPO, Office Action, Application No. 201110097656.6, dated Feb. 27, 2014, 3 pgs.
SIPO, Office Action, Application No. 201010289690.9, dated Mar. 27, 2014, 3 pgs.
SIPO, Notification of Completion of Formalities for Registration, Application No. 201110097656.6, dated Dec. 3, 2014, 2 pgs.
SIPO, Notification of Grant of Rights for Invention Patent, Application No. 201110097656.6, dated Dec. 3, 2014, 2 pgs.
SIPO, Notification of Completion of Formalities for Registration, Application No. 200710152676.2, dated Oct. 10, 2014, 2 pgs.
SIPO, Notification of Grant of Rights for Invention Patent, Application No. 200710152676.2, dated Oct. 10, 2014, 2 pgs.
EPO, Search Report, Application No. 07108383.6, dated Sep. 17, 2007, 10 pgs.
EPO, Search Report, Application No. 07114570.0, dated Jan, 2, 2008, 14 pgs.
EPO, Extended Search Report, Application No. 08161805.0, dated Oct. 22, 2008, 8 pgs.
European Patent Office; EP Search Report for Application No. 06118838.9-1244; dated Jan. 23, 2007; 6 pages.
EPO Extended European Search Report in Application No. 09154845.3; European Patent Office; dated Apr. 22, 2009; 6 pages.
EPO Communication; Application No. 07114570.0; European Patent Office; dated Feb. 12, 2010; 4 pgs.
EPO Communication Examination Report, Application No. 09154845.3, European Patent Office, dated Jul. 28, 2010, 3 pgs.
EP Communication Examiner's Report, Application No. 10 179 032. 7, European Patent Office, dated Oct. 29, 2010, 5 pgs.
EP Communication Examiner's Report, Application No. 08 161 805.0, European Patent Office, dated Nov. 2, 2010, 4 pgs.
EP Communication Extended Search Report, Application No. 10 180 747.7, European Patent Office, dated Nov. 5, 2010, 6 pgs.
EP Communication Examiner's Report, Application No. 06 250 110. 1, European Patent Office, dated Jul. 20, 2006, 5 pgs.
EP Communication Search Report, Application No. 06 250 110.1, European Patent Office, dated Jun. 30, 2006, 3 pgs.
EP Communication Search Report, Application No. 06 121 686.7. European Patent Office, dated Mar. 27, 2007, 5 pgs.
EP Communication Search Report, Application No. 06 250 631.6, European Patent Office, dated Jul. 6, 2005, 3 pgs.
EP Extended European Search Report, Application No. 10184609.5, European Patent Office, dated Jan. 14, 2011, 8 pgs.
EPO, Examination Report, Application No. 07114570.0, dated Apr. 11, 2011, 7 pgs.
EPO, Extended Search Report, Application No. 10180747.7, dated Nov. 5, 2010, 7 pgs.
EPO, Decision to Grant a European Patent Pursuant to Article 97(1) EPC, Application No. 07108383.6, dated May 26, 2011, 1 pg.
EPO, Communication Pursuant to Article 94(3) EPC, Application No. 10180747.7, dated Jun. 20, 2011, 3 pgs.
EPO, Communication Pursuant to Article 94(3) EPC, Application No. 08161805.0, dated May 18, 2011, 2 pgs.
EPO, Communication Pursuant to Article 94(3) EPC, Application No. 10179032.7, dated May 27, 2011, 4 pgs.
EPO, Communication Pursuant to Article 94(3) EPC, Application No. 06118838.9, dated Oct. 19, 2011, 5 pgs.
EPO, Communication Pursuant to Article 94(3) EPC, Application No. 10179032.7, dated Oct. 12, 2011, 4 pgs.
EPO, European Search Report, Application No. 11166620.2, dated Aug. 23, 2011, 9 pgs.
EPO, Invitation Pursuant to Article 94(3) and Rule 71 (1) EPC, Application No. 08161805.0, dated Sep. 22, 2011, 3 pgs.
EPO, Invitation Pursuant to Article 94(3) and Rule 71(1) EPC, Application No. 10180747.7, dated Oct. 27, 2011, 3 pgs.
EPO, Communication Under Rule 71 (3) EPC, Application No. 08161805.0, dated Nov. 4, 2011, 5 pgs.
EPO, Communication Pursuant to Article 94(3) EPC, Application No. 10184609.5, dated Dec. 2, 2011, 3 pgs.
EPO, Decision to grant a European patent pursuant to Article 97(1) EPC, Application No. 08161805.0, dated Mar. 29, 2012, 1 pg.
EPO, Communication under Rule 71(3) EPC, Application No. 10180747.7, dated Mar. 19, 2012, 3 pgs.
EPO, Summons to Attend Oral Proceedings Pursuant to Rule 115(1) EPC, Application No. 10179032.7, dated Jun. 19, 2012, 3 pgs.
EPO, Result of Consultation, Application No. 10179032.7, dated Oct. 10, 2012, 3 pgs.
EPO, Summons to Attend Oral Proceedings Pursuant to Rule 115(1) EPC, Application No. 10184609.5, dated Oct. 12, 2012, 5 Pgs.
EPO, Decision to Grant a European Patent Pursuant to Article 97(1) EPC, Application No. 06121686.7, dated Jun. 3, 2011, 1 pg.
EPO, Decision to Refuse a European Patent Application, Application No. 10179032.7, dated Nov. 5, 2012, 7 pgs.
EPO, Decision to Refuse a European Patent Application, Application No. 10184609.5, dated Mar. 6, 2013, 20 pgs.
EPO, Communication under Rule 71 (3) Epc Intention to Grant, Application No. 06118838.9, dated Jun. 11, 2014, 6 pgs.
EPO, Extended Search Report, Application No. 14179924.7, dated Sep. 1, 2014, 8 pgs.
EPO, Notification of European Publication Number and Information on the Application of Article 67(3) EPC, Application No. 14179924.7, dated Oct. 17, 2014, 2 pgs.
IP India, First Examination Report, Application No. 2158/CHE/2007, dated Jul. 27, 2012, 2 pgs.

(56) References Cited

OTHER PUBLICATIONS

IP India, First Examination Report, Application No. 1684/DEL/2007, dated Oct. 30, 2012, 1 pg.
IP India, First Examination Report, Application No. 2060/DEL/2007, dated Mar. 6, 2013, 2 pgs.
IP India, Examination Report, Application No. 2158/CHE/2007, dated Jan. 16, 2013, 2 pgs.
Japanese Office Action, Application No. 2007-259204, Japan IPO, dated Aug. 5, 2010, 4 pgs.
Japanese Office Action, Application No. 2007-210225, Japan IPO, dated Sep. 10, 2010, 4 pgs.
JPO, Office Action, Application No. 2007-015879, dated Apr. 20, 2011, 4 pgs.
JPO, Office Action, Application No. 2007-000839, dated Jun. 7, 2012, 4 pgs.
JPO, Notice of Final Rejection, Application No. 2007-000839, dated Feb. 1, 2013, 9 pgs.
IPO Japan, Office Action, Application No. 2012-178668, dated Dec. 4, 2013, 3 pgs.
Korean Patent Office; Notice Requesting Submission of Opinion with English Translation; dated Aug. 7, 2008; 11 pages.
KIPO, Office Action, Application No. 10-2007-0002913, dated Jun. 27, 2012, 8 pgs.
KIPO, Office Action, Application No. 10-2012-0086827, dated Oct. 17, 2012, 4 pgs.
KIPO, Notice of Allowance of Patent, Application No. 10-2007-0002913, dated Nov. 20, 2012, 3 pgs.
KIPO, Notice of Allowance of Patent, Application No. 10-2012-0086827, dated Feb. 8, 2013, 3 pgs.
KIPO, Office Action, Application No. 10-2007-0099283, dated Sep. 5, 2013, 3 pgs.
IPO Korea, Notice of Allowance of Patent, Application No. 10-2007-0099283, dated Nov. 28, 2013, 1 pg.
Mexican Office Action; Application No. MX/a/2007/012131; Mexican Patent Office; dated Feb. 19, 2010; 2 pgs.
Mexican Office Action; Application No. MX/a/2007/012244, dated Jul. 15, 2010, 2 pgs.
Mexican Office Action, Application No. MX/a/2007/012131, Mexican IPO, dated Aug. 25, 2010, 4 pgs.
Mexican Office Action, Application No. MX/a/2007/009711, Mexican IPO, dated Feb. 4, 2010, 2 pgs.
IPOS, Patents Granted Under Section 35, Application No. 201002320-8, dated Jan. 30, 2012, 1 pg.
Taiwanese Office Action, Application No. 096100821, Intellectual Property Office, dated Jun. 8, 2010, 2 pgs.
Taiwanese Office Action, Application No. 096102838, Taiwan IPO, dated Aug. 10, 2010, 4 pgs.
TIPO, Office Action, Application No. 096129747, dated Apr. 6, 2011, 4 pgs.
TIPO, Office Action, Application No. 096135965, dated Feb. 24, 2011, 4 pgs.
TIPO, Office Action, Application No. 096136933, dated Mar. 24, 2011, 6 pgs.
TIPO, Decision of the Intellectual Property Office, Application No. 096100821, dated May 30, 2011, 4 pgs.
TIPO, Decision of the Intellectual Property Office, Application No. 096102838, dated May 23, 2011, 9 pgs.
USPTO, Office Action, U.S. Appl. No. 11/328,875, dated Jan. 8, 2008, 16 pgs.
USPTO, Office Action, U.S. Appl. No. 11/328,875, dated Oct. 20, 2008, 13 pgs.
USPTO, Office Action, U.S. Appl. No. 11/328,875, dated Apr. 9, 2009, 16 pgs.
USPTO, Office Action, U.S. Appl. No. 11/328,875, dated Sep. 1, 2009, 8 pgs.
USPTO, Office Action, U.S. Appl. No. 11/347,874, dated Jan. 8, 2008, 18 pgs.
USPTO, Office Action, U.S. Appl. No. 11/347,874, dated May 9, 2008, 18 pgs.
USPTO, Examiner Interview Summary, U.S. Appl. No. 11/347,874, dated May 27, 2008, 2 pgs.
USPTO, Office Action, U.S. Appl. No. 11/347,874, dated Oct. 27, 2008, 14 pgs.
USPTO, Office Action, U.S. Appl. No. 11/347,874, dated Apr. 6, 2009, 18 pgs.
USPTO, Office Action, U.S. Appl. No. 11/347,874, dated Jun. 16, 2009, 10 pgs.
USPTO, Office Action, U.S. Appl. No. 11/347,874, dated Dec. 28, 2009, 8 pgs.
USPTO, Office Action, U.S. Appl. No. 11/503,465, dated Jan. 8, 2008, 14 pgs.
USPTO, Office Action, U.S. Appl. No. 11/503,465, dated Oct. 22, 2008, 9 pgs.
USPTO, Office Action, U.S. Appl. No. 11/503,465, dated Jan. 15, 2009, 9 pgs.
USPTO, Office Action, U.S. Appl. No. 11/503,465, dated Aug. 4, 2009, 9 pgs.
USPTO, Office Action, U.S. Appl. No. 11/542,462, dated Jan. 22, 2008, 15 pgs.
USPTO, Office Action, U.S. Appl. No. 11/542,462, dated Dec. 8, 2008 13 pgs.
USPTO, Advisory Office Action, U.S. Appl. No. 11/542,462, dated Feb. 27, 2009, 3 pgs.
USPTO, Office Action, U.S. Appl. No. 11/542,462, dated Jul. 3, 2009, 13 pgs.
USPTO, Office Action, U.S. Appl. No. 11/542,462, dated Feb. 25, 2010, 14 pgs.
USPTO, Office Action, U.S. Appl. No. 11/542,462, dated Oct. 14, 2010, 11 pgs.
USPTO, Office Action, U.S. Appl. No. 11/740,102, dated Jan. 22, 2008, 17 pgs.
USPTO, Office Action, U.S. Appl. No. 11/740,102, dated Dec. 8, 2008, 13 pgs.
USPTO, Office Action, U.S. Appl. No. 11/833,767, dated Jan. 24, 2008, 43 pgs.
USPTO, Office Action, U.S. Appl. No. 11/833,767, dated Nov. 14, 2008, 20 pgs.
USPTO, Office Action, U.S. Appl. No. 11/833,767, dated May 13, 2009, 14 pgs.
USPTO, Office Action, U.S. Appl. No. 12/830,650, dated Feb. 9, 2012, 9 pgs.
USPTO, Office Action, U.S. Appl. No. 12/831,324, dated Feb. 28, 2012, 6 pgs.
USPTO, Office Action, U.S. Appl. No. 12/830,650, dated Jul. 12, 2012, 20 pgs.
USPTO, Notice of Allowance, U.S. Appl. No. 12/831,324, dated Aug. 6, 2012, 20 pgs.
USPTO, Office Action, U.S. Appl. No. 12/732,041, dated Feb. 9, 2012, 13 pgs.
USPTO, Notice of Allowance, U.S. Appl. No. 12/732,041, dated Sep. 28, 2012, 19 pgs.
USPTO, Office Action, U.S. Appl. No. 12/830,650, dated Mar. 5, 2013, 7 pgs.
USPTO, Notice of Allowance, U.S. Appl. No. 12/830,650, dated Jun. 12, 2013, 9 pgs.
USPTO, Notice of Allowance, U.S. Appl. No. 12/915,125, dated Jul. 19, 2013, 9 pgs.
USPTO, Supplemental Notice of Allowability, U.S. Appl. No. 12/830,650, dated Aug. 22, 2013, 2 pgs.
USPTO, Supplemental Notice of Allowability, U.S. Appl. No. 12/915,125, dated Nov. 4, 2013, 2 pgs.
PCT Notification of Transmittal of the International Search Report and the Written Opinion of the International Searching Authority, or the Declaration; International Searching Authority; dated Sep. 23, 2008; 14 pages.
IP India, Hearing Notice in Reference of Application No. 70/DEL/2007 issued in Indian Application No. 70/DEL/2007 on Aug. 1, 2018, 2 pages.
Brazilian Examination Report issued in Brazilian Application No. 0705973-6 dated Jul. 4, 2019, 4 pages.
Office action issued in Brazilian application No. PI0705973-6 dated Oct. 17, 2019, 9 pages (with English Translation).

(56) References Cited

OTHER PUBLICATIONS

Office action issued in Brazilian application No. PI0705973-6 dated Feb. 12, 2020, 9 pages (With English Translation).
SIPO, First Office Action, Application No. 200710002106.5, Dec. 11, 2009, 9 pgs.
SIPO, Second Office Action, Application No. 200710002106.5, Jan. 10, 2011, 5 pgs.
USPTO, Notice of Allowance, U.S. Appl. No. 12/915,125, Jul. 19, 2013, 9 pgs.
USPTO, Supplemental Notice of Allowability, U.S. Appl. No. 12/915,125, Nov. 4, 2013, 2 pgs.
CIPO, Office Action, Application No. 201110097656.6, Nov. 5, 2013, 3 pgs.
IPO Korea, Notice of Allowance of Patent, Application No. 10-2007-0099283, Nov. 28, 2013, 1 pg.
IPO Japan, Office Action, Application No. 2012-178668, Dec. 4, 2013, 3 pgs.
CIPO, Office Action, Application No. 2,683,989, Aug. 8, 2013, 3 pgs.
KIPO, Office Action, Application No. 10-2007-0099283, Sep. 5, 2013, 3 pgs.
SIPO, Second Office Action, Application No. 201010289690.9, Sep. 6, 2013, 9 pgs.
USPTO, Supplemental Notice of Allowability, U.S. Appl. No. 12/830,650, Aug. 22, 2013, 2 pgs.
EPO, Extended Search Report, Application No. 10180747.7, Nov. 5, 2010, 7 pgs.
EPO, Communication Pursuant to Article 94(3) EPC, Application No. 10180747.7, Jun. 20, 2011, 3 pgs.
EPO, Invitation Pursuant to Article 94(3) and Rule 71(1) EPC, Application No. 10180747.7, Oct. 27, 2011, 3 pgs.
EPO, Communication under Rule 71(3) EPC, Application No. 10180747.7, Mar. 19, 2012, 3 pgs.
EPO, Extended Search Report, Application No. 10184609.5, Jan. 14, 2011, 8 pgs.
EPO, Communication Pursuant to Article 94(3) EPC, Application No. 10184609.5, Dec. 2, 2011, 3 pgs.
EPO, Summons to Attend Oral Proceedings Pursuant to Rule 115(1) EPC, Application No. 10184609.5, Oct. 12, 2012, 5 pgs.
EPO, European Search Report, Application No. 11166620.2, Aug. 23, 2011, 9 pgs.
IMPI, Office Action, Application No. MX/a/2007/009711, Feb. 4, 2010, 2 pgs.
IMPI, Office Action, Application No. MX/a/2007/012131, Feb. 19, 2010, 2 pgs.
IMPI, Office Action, Application No. MX/a/2007/012131, Aug. 25, 2010, 2 pgs.
IMPI, Office Action, Application No. MX/a/2007/012244, Jul. 15, 2010, 2 pgs.
IP Australia, Examiner's Report, Application No. 2007/200,056, Jun. 2, 2010, 2 pgs.
IP Australia, Notice of Acceptance, Application No. 2007/200,056, Oct. 27, 2010, 3 pgs.
IP Australia, Examiner's First Report, Application No. 2007/200,330, Jul. 19, 2010, 2 pgs.
IP Australia, Notice of Acceptance, Application No. 2007/200,330, Jul. 29, 2011, 3 pgs.
IP Australia, Notice of Acceptance, Application No. 2007/221,777, Oct. 14, 2010, 3 pgs.
IP Australia, Examiner's First Report, Application No. 2007/221,785, Jan. 29, 2009, 2 pgs.
IP India, First Examination Report, Application No. 2158/CHE/2007, Jul. 27, 2012, 2 pgs.
IPOS, Patents Granted Under Section 35, Application No. 201002320-8, Jan. 30, 2012, 1 pg.
JPO, Office Action, Application No. 2007-000839, Jun. 7, 2012, 4 pgs.
JPO, Office Action, Application No. 2007-015879, Apr. 20, 2011, 4 pgs.
JPO, Office Action, Application No. 2007-210025, Sep. 10, 2010, 4 pgs.
JPO, Office Action, Application No. 2007-259204, Aug. 5, 2010, 4 pgs.
KIPO, Office Action, Application No. 10-2007-0002913, Jun. 27, 2012, 8 pgs.
KIPO, Notice Requesting Submission of Opinion, Application No. 10-2007-00-12104, Aug. 7, 2008, 11 pgs.
KIPO, Office Action, Application No. 10-2012-0086827, Oct. 17, 2012, 4 pgs.
PCT Search Report, Application No. PCT/US2008/061368, Sep. 23, 2008, 14 pgs.
SIPO, First Office Action, Application No. 200710007388.8, Oct. 30, 2009, 9 pgs.
SIPO, Second Office Action, Application No. 200710007388.8, May 12, 2010, 3 pgs.
SIPO, Office Action, Application No. 200710152676.2, Mar. 29, 2010, 3 pgs.
SIPO, Second Office Action, Application No. 200710152676.2, Oct. 27, 2011, 3 pgs.
SIPO, Office Action, Application No. 200710152676.2, Jun. 4, 2012, 4 pgs.
SIPO, Rejection Decision, Application No. 200710152676.2, Sep. 29, 2012, 2 pgs.
SIPO, First Office Action, Application No. 200710162407.4, Jun. 11, 2010, 4 pgs.
SIPO, Second Office Action, Application No. 200710162407.4, Dec. 16, 2011, 2 pgs.
SIPO, Office Action, Application No. 200710162407.4, Jun. 26, 2012, 5 pgs.
SIPO, Rejection Decision, Application No. 200710162407.4, Oct. 9, 2012, 6 pgs.
SIPO, First Office Action, Application No. 200710194436.9, Jun. 2, 2010, 8 pgs.
SIPO, Second Office Action, Application No. 200710194436.9, Dec. 23, 2011, 3 pgs.
SIPO, Third Office Action, Application No. 200710194436.9, Jul. 20, 2012, 2 pgs.
SIPO, First Office Action, Application No. 201110097656.6, May 6, 2013, 3 pgs.
TIPO, Decision of the Intellectual Property Office, Application No. 096100821; Jun. 8, 2010, 2 pgs.
TIPO, Decision of the Intellectual Property Office, Application No. 096100821, May 30, 2011, 4 pgs.
TIPO, Decision of the Intellectual Property Office, Application No. 096102838, Aug. 10, 2010, 4 pgs.
TIPO, Decision of the Intellectual Property Office, Application No. 096102838, May 23, 2011, 9 pgs.
TIPO, Decision of the Intellectual Property Office, Application No. 096129747, Apr. 6, 2011, 4 pgs.
TIPO, Decision of the Intellectual Property Office, Application No. 096135965, Feb. 24, 2011, 4 pgs.
TIPO, Decision of the Intellectual Property Office, Application No. 096136933, Mar. 24, 2011, 6 pgs.
USPTO, Office Action, U.S. Appl. No. 11/328,875, Jan. 8, 2008, 16 pgs.
USPTO, Office Action, U.S. Appl. No. 11/328,875, Oct. 20, 2008, 13 pgs.
USPTO, Office Action, U.S. Appl. No. 11/328,875, Apr. 9, 2009, 16 pgs.
USPTO, Office Action, U.S. Appl. No. 11/328,875, Sep. 1, 2009, 8 pgs.
USPTO, Office Action, U.S. Appl. No. 11/347,874, Jan. 8, 2008, 18 pgs.
USPTO, Office Action, U.S. Appl. No. 11/347,874, May 9, 2008, 18 pgs.
USPTO, Examiner Interview Summary, U.S. Appl. No. 11/347,874, May 27, 2008, 2 pgs.
USPTO, Office Action, U.S. Appl. No. 11/347,874, Oct. 27, 2008, 14 pgs.
USPTO, Office Action, U.S. Appl. No. 11/347,874, Dec. 28, 2009, 8 pgs.

(56) References Cited

OTHER PUBLICATIONS

USPTO, Office Action, U.S. Appl. No. 11/347,874, Apr. 6, 2009, 18 pgs.
USPTO, Office Action, U.S. Appl. No. 11/347,874, Jun. 16, 2009, 10 pgs.
USPTO, Office Action, U.S. Appl. No. 11/503,465, Jan. 8, 2008, 14 pgs.
USPTO, Office Action, U.S. Appl. No. 11/503,465, Oct. 22, 2008, 9 pgs.
USPTO, Office Action, U.S. Appl. No. 11/503,465, Jan. 15, 2009, 9 pgs.
USPTO, Office Action, U.S. Appl. No. 11/503,465, Aug. 4, 2009, 9 pgs.
USPTO, Office Action, U.S. Appl. No. 11/542,462, Jan. 22, 2008, 16 pgs.
USPTO, Office Action, U.S. Appl. No. 11/542,462; Dec. 8, 2008, 13 pgs.
USPTO, Advisory Office Action, U.S. Appl. No. 11/542,462, Feb. 27, 2009, 3 pgs.
USPTO, Office Action, U.S. Appl. No. 11/542,462, Jul. 3, 2009, 13 pgs.
USPTO, Office Action, U.S. Appl. No. 11/542,462, Feb. 25, 2010, 14 pgs.
USPTO, Office Action, U.S. Appl. No. 11/542,462, Oct. 14, 2010, 11 pgs.
USPTO, Office Action, U.S. Appl. No. 11/740,102, Jan. 22, 2008, 17 pgs.
USPTO, Office Action, U.S. Appl. No. 11/740,102, Dec. 8, 2008, 13 pgs.
USPTO, Office Action, U.S. Appl. No. 11/833,767, Jan. 24, 2008, 43 pgs.
USPTO, Office Action, U.S. Appl. No. 11/833,767, Nov. 14, 2008, 20 pgs.
USPTO, Office Action, U.S. Appl. No. 11/833,767, May 13, 2009, 14 pgs.
USPTO, Office Action, U.S. Appl. No. 12/830,650, Feb. 9, 2012, 9 pgs.
USPTO, Office Action, U.S. Appl. No. 12/830,650, Jul. 12, 2012, 20 pgs.
USPTO, Notice of Allowance, U.S. Appl. No. 12/830,650, Jun. 12, 2013, 9 pgs.
USPTO, Office Action, U.S. Appl. No. 12/831,324, Feb. 28, 2012, 6 pgs.
USPTO, Notice of Allowance, U.S. Appl. No. 12/831,324, Aug. 6, 2012, 20 pgs.
3GPP TR 23.806, "Voice Call Continuity between CS and IMS Study;" Technical Specification Group Services and System Aspects; Global System for Mobile Communications; 3GPPP TR 23.806, V7.0.0 Release 7, Dec. 2005, pp. 1-153.
3GPP TS 03.03, Digital Cellular Telecommunications System (Phase 2+), Sep. 2003, pp. 1-22.
3GPP TS 23.206, V. 1.2.0, 3rd Generation Partnership Project, Technical Specification Group Services and System Aspects, Voice Call Continuity between CS and IMS, Stage 2 (Release 7), Aug. 2006, 41 pgs.
3GPP TS 23.206, Voice Call Continuity (VCC) between Circuity Switched (CS) and IP Multimedia Subsystem (IMS), Technical Specification Group Services and System Aspects, 3GPPP TS 23.206, R 7.3.0, Stage 2 (Release 7), Jun. 2007, 36 pgs.
3GPP TS 23.218 3rd Generation Partnership Project, Technical Specification Group Core Network and Terminals, IP Multimedia (IM) Session Handling, IM Call Model, Stage 2, 3GPPTS 23.218, V9.1.0, Mar. 2010, pp. 1-65.
3GPP TS 23.228 3rd Generation Partnership Project, Technical Specification Group Services and System Aspects, IP Multimedia Subsystem (IMS), Stage 2, 3GPP TS 23.228, V9.4.0, Release 9, Sep. 2010, pp. 1-253.
3GPP TS 24.206, "Voice Call Continuity between the Circuit-Switched (CS) Domain and the IP Multimedia (IP) Core Netwot (CN) Subsystem," Stage 3 (Release 7), Sep. 2006, 96 pgs.
3GPP TSG-SA2, Change Request: "Use of SIP 380 Alternative Service to Support Dynamic VDNs," 3GPP, TSG-SA2, Mtg #55, Oct. 18, 2006, 7 pgs.
3GPP TSG-SA2, Meeting #55, Busan, South Korea, Oct. 23-27, 2006, pp. 1-7.
Alexiou et al., SIP Allocate Method, SIPPING Working Group, Feb. 2002, pp. 1-9.
Mouly et al., "The GSM System for Mobile Communications—Communication Management," GSM System for Mobile Communications, Comprehensive Overview of the European Digital Cellular Systems, [S.L.]: Cell & Sys, 1992, XP002103158 ISBN: 2-9507190-0-7, pp. 501-565.
Oxley et al., "Techniques to Support VoIP Using WAP in a 2G and GPRS in 2.5G Networks," IP.com Journal, IP.com Inc., West Henrietta, NY, US, Feb. 22, 2002, XP013002148, 5 pgs.
Siemans AG, "Interworking Between the IMS Messaging Services and SMS and MMS," Sep. 16, 2006, 4 pgs.
CIPO, Office Action, Application No. 2,605,102, Nov. 3, 2011, 2 pgs.
SIPO, Office Action, Application No. 201110097656.6, Feb. 27, 2014, 3 pgs.
SIPO, Office Action, Application No. 201010289690.9, Mar. 27, 2014, 3 pgs.
CIPO, Office Action, Application No. 2,573,433, Apr. 15, 2010, 5 pgs.
CIPO, Office Action, Application No. 2,576,877, Nov. 17, 2010, 5 pgs.
CIPO, Notice of Allowance, Application No. 2,576,877, Nov. 4, 2011, 1 pg.
CIPO, Office Action, Application No. 2,596,774, Dec. 14, 2010, 10 pgs.
CIPO, Notice of Allowance, Application No. 2,596,774, Aug. 31, 2011, 1 pg.
CIPO, Office Action, Application No. 2,605,098, Mar. 4, 2011, 4 pgs.
CIPO, Notice of Allowance, Application No. 2,605,098, Dec. 13, 2011, 1 pg.
CIPO, Office Action, Application No. 2,605,102, Mar. 3, 2011, 4 pgs.
CIPO, Office Action, Application No. 2,605,102, Nov. 21, 2012, 3 pgs.
CIPO, Notice of Allowance, Application No. 2,605,102, Mar. 27, 2013, 1 pg.
CIPO, Office Action, Application No. 2,683,989, May 10, 2012, 2 pgs.
EPO, Search Report, Application No. 06118838.9, Jan. 23, 2007, 6 pgs.
EPO, Communication Pursuant to Article 94(3) EPC, Application No. 06118838.9, Oct. 19, 2011, 4 pgs.
EPO, Search Report, Application No. 06121686.7, Mar. 27, 2007, 5 pgs.
EPO, Decision to Grant a European Patent Pursuant to Article 97(1) EPC, Application No. 06121686.7, Jun. 3, 2011, 1 pg.
EPO, Search Report, Application No. 06250110.1, Jun. 30, 2006, 3 pgs.
EPO, Examination Report, Application No. 06250110.1, Jul. 20, 2006, 5 pgs.
EPO, Search Report, Application No. 06250631.6, Jul. 6, 2005, 3 pgs.
EPO, Search Report, Application No. 07108383.6, Sep. 17, 2007, 10 pgs.
EPO, Decision to Grant a European Patent Pursuant to Article 97(1) EPC, Application No. 07108383.6, May 26, 2011, 1 pg.
EPO, Search Report, Application No. 07114570.0, Jan. 2, 2008, 14 pgs.
EPO, Communication, Application No. 07114570.0, Feb. 12, 2010, 4 pgs.
EPO, Examination Report, Application No. 07114570.0, Apr. 11, 2011, 7 pgs.
EPO, Extended Search Report, Application No. 08161805.0, Oct. 22, 2008, 8 pgs.
EPO, Search Report, Application No. 08161805.0, Nov. 2, 2010, 4 pgs.

(56) References Cited

OTHER PUBLICATIONS

EPO, Communication Pursuant to Article 94(3) EPC, Application No. 08161805.0, May 18, 2011, 2 pgs.
EPO, Invitation Pursuant to Article 94(3) and Rule 71(1) EPC, Application No. 08161805.0, Sep. 22, 2011, 3 pgs.
EPO, Communication Under Rule 71(3) EPC, Application No. 08161805.0, Nov. 4, 2011, 5 pgs.
EPO, Decision to Grant a European Patent Pursuant to Article 97(1) EPC, Application No. 08161805.0, Mar. 29, 2012, 1 pg.
EPO, Search Report, Application No. 09154845.3, Apr. 22, 2009, 6 pgs.
EPO, Examination Report, Application No. 09154845.3, Jul. 28, 2010, 3 pgs.
EPO, Search Report, Application No. 101080747.7, Nov. 5, 2010, 7 pgs.
EPO, Communication Examiner's Report, Application No. 10179032.7, Oct. 29, 2010, 5 pgs.
EPO, Communication Pursuant to Article 94(3) EPC, Application No. 10179032.7, May 27, 2011, 4 pgs.
EPO, Communication Pursuant to Article 94(3) EPC, Application No. 10179032.7, Oct. 12, 2011, 4 pgs.
EPO, Summons to Attend Oral Proceedings Pursuant to Rule 115(1) EPC, Application No. 10179032.7, Jun. 19, 2012, 3 pgs.
EPO, Result of Consultation, Application No. 10179032.7, Oct. 10, 2012, 3 pgs.
EPO, Decision to Refuse a European Patent Application, Application No. 10179032.7, Nov. 5, 2012, 7 pgs.
EPO, Decision to Refuse a European Patent Application, Application No. 10184609.5, Mar. 6, 2013, 20 pgs.
IP India, First Examination Report, Application No. 1684/DEL/2007, Oct. 30, 2012, 1 pg.
IP India, First Examination Report, Application No. 2060/DEL/2007, Mar. 6, 2013, 2 pgs.
IP India, Examination Report, Application No. 2158/CHE/2007, Jan. 16, 2013, 2 pgs.
JPO, Notice of Final Rejection, Application No. 2007-000839, Feb. 1, 2013, 9 pgs.
KIPO, Notice of Allowance of Patent, Application No. 10-2007-0002913, Nov. 20, 2012, 3 pgs.
KIPO, Notice of Allowance of Patent, Application No. 10-2012-0086827, Feb. 8, 2013, 3 pgs.
SIPO, Notification of Grant of Rights for Invention Patent, Application No. 200710194436.9, Jan. 4, 2013, 2 pgs.
SIPO, First Office Action, Application No. 201010289690.9, Jan. 16, 2013, 2 pgs.
USPTO, Office Action, U.S. Appl. No. 12/732,041, Feb. 9, 2012, 13 pgs.
USPTO, Notice of Allowance, U.S. Appl. No. 12/732,041, Sep, 28, 2012, 19 pgs.
USPTO, Office Action, U.S. Appl. No. 12/830,650, Mar. 5, 2013, 7 pgs.
EPO, Communication under Rule 71(3) EPC Intention to Grant, Application No. 06118838.9, Jun. 11, 2014, 6 pgs.
CIPO, Office Action, Application No. 2,683,989, Jul. 7, 2014, 3 pgs.
EPO, Extended Search Report, Application No. 14179924.7, Sep. 1, 2014, 8 pgs.
SIPO, Notification of Completion of Formalities for Registration, Application No. 201110097656.6, Dec. 3, 2014, 2 pgs.
SIPO, Notification of Grant of Rights for Invention Patent, Application No. 201110097656.6, Dec. 3, 2014, 2 pgs.
SIPO, Notification of Completion of Formalities for Registration, Application No. 200710152676.2, Oct. 10, 2014, 2 pgs.
SIPO, Notification of Grant of Rights for Invention Patent, Application No. 200710152676.2, Oct. 10, 2014, 2 pgs.
EPO, Notification of European Publication Number and Information on the Application of Article 67(3) EPC, Application No. 14179924.7, Oct. 17, 2014, 2 pgs.

SYSTEM AND METHOD FOR ORIGINATING A CALL VIA A CIRCUIT-SWITCHED NETWORK FROM A USER EQUIPMENT DEVICE

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CLAIM OF PRIORITY UNDER 35 U.S.C. §120 & 37 C.F.R. §178

This nonprovisional application is a continuation application claiming the benefit of the following prior United States patent application entitled: "SYSTEM AND METHOD FOR ORIGINATING A SIP CALL VIA CIRCUIT-SWITCHED NETWORK FROM A USER EQUIPMENT DEVICE", application Ser. No. 12/732,041, filed on Mar. 25, 2010, pending, which is a continuation of application Ser. No. 11/740,102, filed on Apr. 27, 2007, now issued as U.S. Pat. No. 7,710,950, which in turn is a Continuation-In-Part (CIP) of and claims priority to "SYSTEM AND METHOD FOR EFFECTUATING A SIP CALL IN A NETWORK ENVIRONMENT INCLUDING IMS", application Ser. No. 11/347,874, filed on Feb. 6, 2006, now issued as U.S. Pat. No. 7,830,868 and is also a CIP of and claims priority to "SYSTEM AND METHOD FOR MANAGING CALL CONTINUITY IN IMS NETWORK ENVIRONMENT USING SIP MESSAGING", application Ser. No. 11/542,462, filed on Oct. 3, 2006, now issued as U.S. Pat. No. 7,995,565, each of which foregoing applications is hereby incorporated by reference herein.

CROSS REFERENCE TO RELATED APPLICATION(S)

[This patent application] *This application is a reissue of U.S. Pat. No. 8,989,179, which* discloses subject matter that is related to the subject matter of U.S. patent application entitled: "SYSTEM AND METHOD FOR MANAGING CALL ROUTING IN A NETWORK ENVIRONMENT INCLUDING IMS", application Ser. No. 11/328,875, filed on Jan. 10, 2006, now issued as U.S. Pat. No. 7,769,000 which is hereby incorporated by reference herein.

FIELD OF THE TECIINOLOGY

The present patent disclosure generally relates to call routing in communications networks. More particularly, and not by way of any limitation, the present patent disclosure is directed to a system and method for managing call routing in a network environment including a circuit-switched (CS) network and an IP multimedia subsystem (IMS) network, wherein a CS-originated IP call (e.g., based on the Session Initiation Protocol or SIP) is to be routed using the IMS network infrastructure.

BACKGROUND

Today's advanced communication devices are capable of seamlessly operating in a packet-switched IP network domain (using, for example, wireless LAN (WLAN) or Wi-MAX networks, etc.) as well as a circuit-switched cellular network domain. To facilitate such capability, current 3rd Generation Partnership Project (3GPP) standards specify a new, IP-based network architecture referred to as the IP multimedia subsystem (IMS) which allows a communication device (referred to as user equipment or UE) to initiate calls to both IP-only subscribers and conventional circuit-switched telephony subscribers using either of the domains. There may arise a situation, however, where a wireless device, i.e. a UE device in 3GPP, is able to make a voice call to a called party using the circuit-switched network domain only because either no packet-switched network is available or the available networks in the packet-switched domain do not support the Voice-over-IP (VoIP) service. In such a situation, if the called party happens to be an IP-only subscriber and is identified with a Uniform Resource Indicator (URI), the originating UE may not be able to make the IP-based call since the UE device can effectuate only E.164 number-based calls while operating in the circuit-switched domain.

BRIEF DESCRIPTION OF THE DRAWINGS

A more complete understanding of the embodiments of the present patent disclosure may be had by reference to the following Detailed Description when taken in conjunction with the accompanying drawings wherein.

DETAILED DESCRIPTION OF THE EMBODIMENTS

Methods and apparatus for originating a Session Initiation Protocol (SIP) call from a user equipment (UE) device in a network environment including a circuit-switched (CS) network and an IP multimedia subsystem (IMS) network to a called party are disclosed. When the SIP call is originated from the UE device in the CS network domain, a SIP Invite message which includes a SIP Uniform Resource Indicator (URI) or Tel URI of the called party is sent from the UE device to an application server (AS) node in the IMS network. At the AS node, a pool of E.164 numbers are maintained as IP multimedia routing numbers (IMRNs) which are utilized for mapping to or otherwise associating with called party URIs. The AS node dynamically allocates a select E.164 number with respect to the called party's URI received from the UE device, and returns it to the UE device in a SIP Response message, e.g., a SIP 380 (Alternative Service) message. Subsequently, the dynamically-allocated E.164 number is sent from the UE device in a call setup message for identification of the URI and other suitable call information at the AS node. Thus, the dynamically-allocated E.164 number is utilized for routing the SIP call towards the called party upon interrogating the SIP URI-IMRN mapping, whereupon it may be released back to the pool of IMRNs for future use. Appropriate timers may be provided at the device and AS node endpoints so that it can be verified whether a call reference number associated with the call remains valid (e.g. it has not timed out) or the dynamically-allocated IMRN remains valid (e.g. it has not timed out). Optionally, the released IMRN may be quarantined for a period of time.

Figure 1:
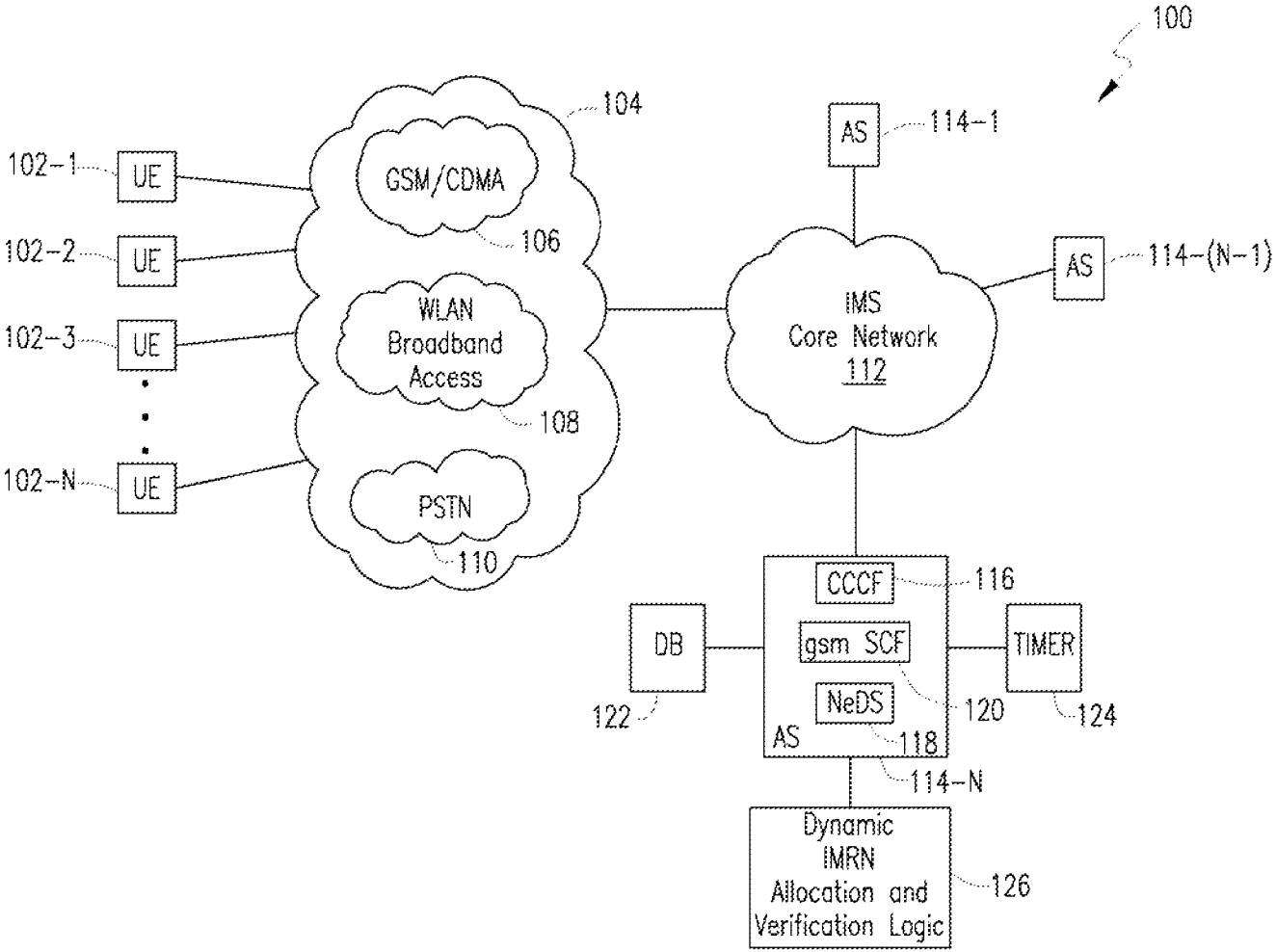
FIG. 1 depicts a network environment including circuit-switched network infrastructure and IM multimedia subsystem (IMS) infrastructure wherein an embodiment of the present patent disclosure may be practiced.

A system and method of the present patent disclosure will now be described with reference to various examples of how the embodiments can best be made and used. Like reference numerals are used throughout the description and several views of the drawings to indicate like or corresponding parts, wherein the various elements are not necessarily drawn to scale. Referring now to the drawings, and more particularly to FIG. 1, an exemplary network environment 100 is depicted wherein an embodiment of the present patent disclosure may be practiced for routing a SIP call originated by a UE device in a circuit-switched network or domain. As depicted, the network environment 100 includes an access space 104 comprised of a number of access technologies available to a plurality of UE devices 102-1 through 102-N. For purposes of the present disclosure, a UE device may be any tethered or untethered communications device, and may include any personal computer (e.g. desktops, laptops, palm-tops, or hand-held computing devices) equipped with a suitable wireless modem or a mobile communications device (e.g. cellular phones or data-enabled handheld devices capable of receiving and sending messages, web browsing, et cetera), or any enhanced PDA device or integrated information appliance capable of email, video mail, Internet access, corporate data access, messaging, calendaring and scheduling, information management, and the like. Preferably, the UE device is capable of operating in multiple modes in that it can engage in both circuit-switched (CS) as well as packet-switched (PS) communications, and can transition from one mode of communications to another mode of communications without loss of continuity.

The access space 104 may be comprised of both CS and PS networks, which may involve wireless technologies, wireline technologies, broadband access technologies, etc. For example, reference numeral 106 refers to wireless technologies such as Global System for Mobile Communications (GSM) networks and Code Division Multiple Access (CDMA) networks, although it is envisaged that the teachings hereof may be extended to any 3$^{rd}$ Generation Partnership Project (3GPP)-compliant cellular network (e.g. 3GPP or 3GPP2) as well. Reference numeral 108 refers to broadband access networks including wireless local area networks or WLANs, Wi-MAX networks as well as fixed networks such as DSL, cable broadband, etc. Also exemplified as part of the access space 104 is the conventional wireline PSTN infrastructure 110.

An IP multimedia subsystem (IMS) core network 112 is coupled to the various access networks set forth above, including any CS-based networks. As is well known, the IMS standard defined by the 3GPP is designed to allow service providers manage a variety of services that can be delivered via IP over any network type, wherein IP is used to transport both bearer traffic and SIP-based signaling traffic. Broadly, IMS is a framework for managing the applications (i.e. services) and networks (i.e. access) that is capable of providing multimedia services. IMS defines an "application server" to be the network element that delivers services subscribers use, e.g. voice call continuity (VCC), Push-To-Talk (PTT), IMS Centralized Services (ICS) etc. IMS manages applications by defining common control components that each application server (AS) is required to have, e.g. subscriber profiles, IMS mobility, network access, authentication, service authorization, charging and billing, inter-operator functions, and interoperation with the legacy phone network.

It should be understood that whereas IMS is defined by the 3GPP standards body which mainly addresses GSM networks, another group, 3GPP2, is involved in defining a closely analogous architecture referred to as Multimedia Domain (MMD). MMD is essentially an IMS for CDMA networks, and since MMD and IMS are roughly equivalent, the term "IMS" may be used in this present patent disclosure to refer collectively to both IMS and MMD where applicable.

Continuing to refer to FIG. 1, reference numerals 114-1 to 114-N refer to a plurality of AS nodes operable to support various services, e.g. VCC, PTT, ICS etc. as alluded to hereinabove. Furthermore, in order to effectuate call control of a SIP call using CS as the voice bearer, one of the AS nodes, e.g. AS 114-(N-1), may be provided for implementing functionality referred to as IMS Centralized Services Control Function (ICCF). ICCF is operable as an IMS application server element that resides in the home IMS network and tracks all call sessions and related mobile Voice-over-IP (VoIP) bearer traffic, between CS and IMS domains. Additional details regarding the functionality of AS 114-(N-1) may be found in the pending U.S. patent application entitled "SYSTEM AND METHOD FOR MANAGING CALL ROUTING INA NETWORK ENVIRONMENT INCLUDING IMS", application Ser. No. 11/328,875, filed Jan. 10, 2006, referenced hereinabove.

Additionally, another AS node, AS 114-N, is provided as part of the core IMS network 112 for facilitating routing of IP/SIP calls originated by one of the UE devices in the CS domain while connectivity in the PS domain is not available or the available PS networks are not capable of supporting the VoIP service (e.g. due to bandwidth limitations). Appropriate database structures (e.g. DB 122), timer mechanisms (e.g. timer 124) and suitable logic 126 may be provided in association with AS 114-N for purposes of configuring and managing a pool of IP multimedia routing numbers (IMRNs) from which a select IMRN may be dynamically-allocated for purposes of SIP call routing as will be described in greater detail below.

In accordance with the teachings of the present patent disclosure, AS 114-N is preferably provided with appropriate logic/structure/software/firmware module(s), such as call continuity control function (CCCF) 116, network domain section (NeDS) 118, and gsm service capability feature (gsm SCF) 120 for performing the following: maintaining a pool of E.164 numbers that are operable as IMRNs which terminate on the AS node, wherein a select E.164 number may be mapped to the received information in the SIP Invite message, including but not limited to, a called party's SIP URI or Tel URI, P-Preferred Identity, Privacy Indication, and Network Access Info header; dynamically allocating the select E.164 number to a received called party's URI (e.g. SIP URI or Tel URI) and other received information and providing the select E.164 number to the originating UE device via a SIP Response message; verifying that the select E.164 number has not timed out when that select E.164 number is returned (via conventional CS call setup) to AS 114-N for effectuating a SIP call session with respect to the called party; and optionally, quarantining the select E.164 number for a period of time upon releasing it back to the pool for future use.

Note that E.164 is indicative of the International Telecommunications Union (ITU) telephone numbering plan, which specifies how and by whom telephone numbers are assigned. The format and notation of E.164 telephone numbers is specified in the ITU standard E.123, for example. To manage a pool of dynamically-allocable IMRNs, the AS node (e.g. AS 114-N) may be configured in a number of ways with respect to the E.164 numbers. For example, a particular E.164 number may be provided as a "starting address" number of an IMRN range. Another E.164 number may operate as a range delimiter with respect to the IMRN range. To allow flexibility, it may be desirable to provide for different pools of IMRNs to be configured from different number ranges. Further, appropriate timer mechanism(s) may be implemented at AS 114-N in order to ensure that the allocated IMRNs remain valid (e.g. they have not timed out, that is, they are used within appropriate time limits) or suitable quarantine times are applied. As will be described in detail below, management of timers associated with IMRNs at AS 114-N and timers associated with call reference numbers at the originating UE device allows for dynamic provisioning of IMRNs that could be used for effectuating SIP calls by the UE device operating in the CS domain.

Figure 2:
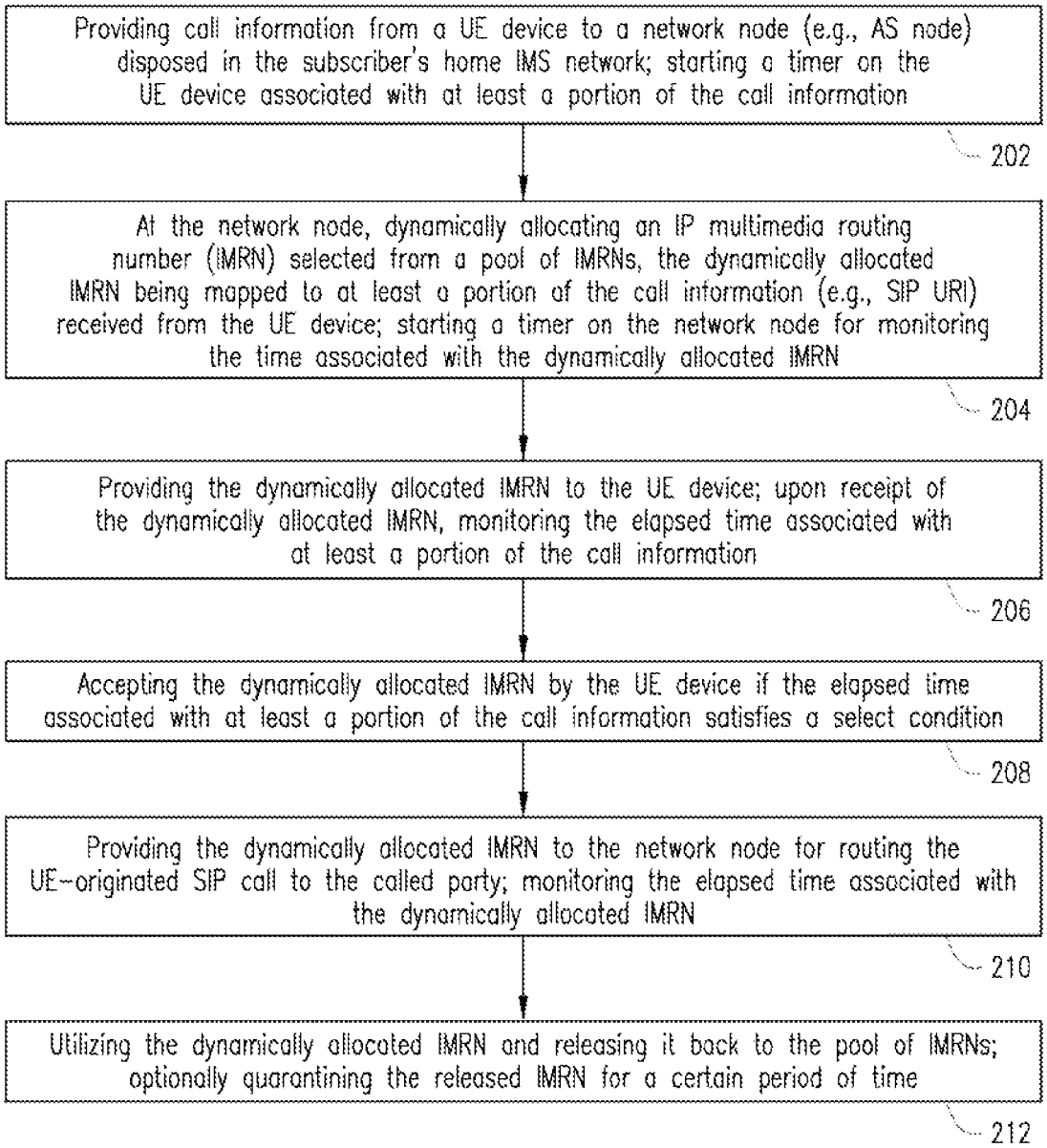
FIG. 2 depicts a flowchart associated with one or more exemplary embodiments of the present patent disclosure.

FIG. 2 depicts a flowchart of an exemplary embodiment of an overall methodology of the present patent disclosure for effectuating a CS-originated SIP call by a UE device with respect to a called party identified by a URI (e.g. a SIP URI or Tel URI). The SIP call is initiated by the end user of the UE device, or the originating party. Preferably, the originating party either enters the URI via a suitable interface (e.g. MMI) or selects it from a list stored in the UE. As is well known, a typical SIP address may take on the form of sip: <username>@<hostname>, which may include additional syntax elements and parameters such as those described in, e.g. RFC 3261 entitled: SIP: Session Initiation Protocol and Internet Draft entitled Obtaining and Using Globally Routable User Agent (UA) URIs (GRUU) in the Session Initiation Protocol (SIP) (draft-ietf-sip-gruu-06) (Expires: Apr. 23, 2006).

Note that a "Tel URI" is presently defined in Request For Comments (RFC) 3966 (December 2004). Some examples of Tel URIs are as follows: (1) tel: +1-201-555-0123: This URI points to a phone number in the United States. The hyphens are included to make the number more human readable; they separate country, area code and subscriber number; (2) tel: 7042;phone-context=example.com: The URI describes a local phone number valid within the context "example.com"; and (3) tel: 863-1234 ;phone-context=+1-914-555: The URI describes a local phone number that is valid within a particular phone prefix.

At block 202, various pieces of information relating to the SIP call (which may be collectively referred to as "call information" herein). The call information may include information such as a call reference number associated with the call, called party's SIP URI (or, the B-URI), Opaque parameter (if available), GRID parameter (if available), additional URI-related information (e.g. display name), calling party's SIP URI (or, the A-URI), Opaque parameter, privacy indicator, network access info header etc. If the calling party sends a B-URI that comprises anAddress of Record (AOR) as well as Opaque and GRID parameters, they will be provided as part of the call information. Additionally, if the calling party sends its own URI comprising AOR, Opaque and GRID parameters, they will also be provided in the call information.

A timer may be initiated on the UE device that is used for monitoring at least a portion of the call information that is transmitted by the originating UE device as described above. In particular, the timer may be implemented for monitoring the elapsed time since a particular call reference number is generated and forwarded to the IMS network node. At the IMS network node, an IMRN selected from the pool of IMRNs is dynamically associated with respect to the call reference number, wherein the IMRN is mapped to the at least a portion of the call information, e.g. the received called party's SIP URI (block 204). In some embodiments, the IMRN may be mapped to all the received SIP call information. Also, a timer may be started at the network node for monitoring a time-to-live variable associated with the dynamically-allocated IMRN.

Thereafter, the dynamically-allocated IMRN is provided to the UE device via a SIP 380 (Alternative Service) Response message. Upon receipt of the SIP 380 (Alternative Service) Response message which includes the dynamically-allocated IMRN at the UE device, the elapsed time associated with the call reference number is monitored to ensure that it is not stale (block 206). The dynamically-allocated IMRN is accepted by the UE device if the time elapsed satisfies a select condition, e.g. within a time-to-live value (block 208). In response, appropriate call setup is then initiated by the UE device using the dynamic IMRN, whereby the accepted IMRN is returned to the AS node since it terminates thereat. Upon receipt of the IMRN at the AS node, its time-to-live variable is monitored to ensure that it has not timed out (block 210). Thereafter, the called party's SIP URI or Tel URI (and any other suitable SIP information originally received that is mapped to the dynamically-allocated IMRN) is utilized by the AS node for effectuating the SIP session with the called party by producing and sending a SIP Invite message (e.g. inserting the A-party URI, Privacy indicator, B-party URI, Opaque parameter, etc., in the SIP Invite message and causing it to be sent to the called party). In one implementation, the dynamic IMRN may optionally be returned back to the pool of IMRNs, wherein it may be quarantined for a certain period of time before it is reused or becomes available for future use (block 212).

Based on the foregoing, those skilled in the art will appreciate that when the call information, i.e. called party's SIP URI or Tel URI, call reference number, etc. is sent by the UE device to the serving AS node, appropriate logic at the AS node may create a record that maps the received call information to an E.164-based IMRN, which is transmitted back to the UE device. Upon correlating the IMRN with the call reference number, the UE sets up a call using the IMRN that terminates on the AS node. The IMRN is then interrogated against the record to retrieve the called party's URI for establishing a SIP session with the called party (i.e. between the calling party (UE device) identified by the A-party address and the called party identified by the B-party address).

It should be further recognized by those skilled in the art that the message flow between the UE device and the home IMS network's AS node may be mediated through a number of other appropriate network infrastructure elements, and may be implemented in a number of ways depending on the device capabilities as well as the network features and protocols being used. Typically, the message flow may be mediated via network elements such as a mobile switching center (MSC) and a media gateway control function (MGCF) element disposed between the UE device and its home IMS AS node operable to facilitate CS-originated SIP calls.

Figure 3A:
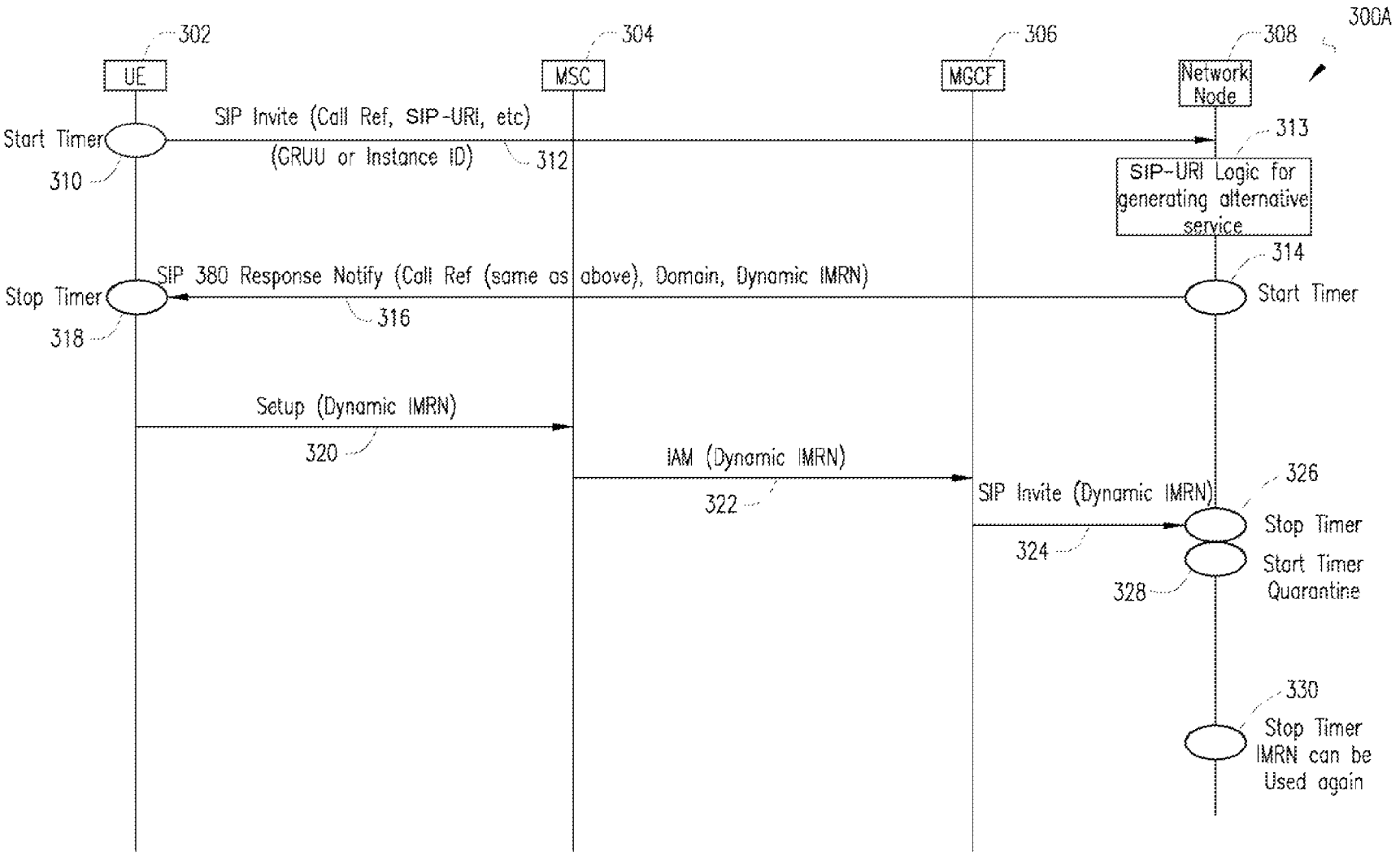
FIGS. 3A and 3B depict exemplary message flow diagrams for originating a SIP call by employing a SIP Invite message with a SIP-URI of the called party in the Request-URI, for mapping with a dynamically-allocated IP multimedia routing number (IMRN) at an application server (AS) node.

FIG. 3A depicts a message flow embodiment 300A for effectuating a CS-originated SIP call based on dynamic IMRN allocation where SIP messaging is implemented. A wireless UE device 302 having the CS domain and IMS domain modes of functionality is operable to generate a SIP Invite message 312 towards an application server (AS) node 308 in response to detecting that a SIP call is being initiated from UE device 302 in the CS domain. As described earlier, the SIP Invite message 312 includes applicable call information such as call reference number, called party's SIP URI, additional URI information, and the like, e.g. A-party AOR in the P_Preferred Identity, Privacy Indicator Opaque parameter, GRID parameter, etc. As described above, the originating party either enters the URI (or SIP address) or Tel URI via a suitable interface (e.g. MMI) or selects it from a list stored in the UE to initiate the call.

The SIP Invite message 312 may further include an indicator in an indicator field that indicates whether the message is for a circuit-switched (CS) mobile-originated (MO) call (i.e. whether UE device 302 intends to make this call via CS domain). For example, a new Network-Access-Info value such as "GERAN-CS" may be utilized. Alternatively, a new feature tag or new URI parameter may be provided in the SIP Invite message. Note, however, that an indication may be assumed merely from the inclusion of the SIP URI or Tel URI of the called party ("B-party") in the SIP Invite message. In one preferred embodiment, the TARGET address in the SIP Invite message is populated with the SIP URI or Tel URI of the called party or B-party. In this case, a SIP URI field of the SIP Invite message is populated with a public service identifier (PSI) of the AS node. A cause value in the SIP Invite message will be set appropriately to indicate that a radio bearer channel for the session is to be established over the CS domain.

A suitable timer mechanism 310 may be initiated at the UE device in order to monitor a time-to-live variable associated with the call reference number. It should be appreciated that this timer may be provided in addition to normal SIP timers as this operation is known to provide a SIP 380 Response with specific information within a certain timeframe.

Responsive to the Invite message 312, which may be mediated via I-CSCF and/or S-CSCF nodes. AS node 308 disposed in the user's home IMS network is operable to launch SIP-URI logic 313 for generating and populating a suitable SIP 380 (Alternative Service) Response message (e.g. SIP 380 Response message) as described above. Upon verifying that the user is allowed to do a SIP call and the Invite message includes the proper CS MO indicator, the network node (in this example, the IMS AS node) dynamically allocates a select IMRN mapped to the call information or parameters (e.g. A-party AOR in the P_Preferred Identity, Privacy Indicator Opaque parameter, GRID parameter, etc.) and returns it back to UE device 302 via SIP 380 message 316. Again, the dynamically-allocated IMRN may be referred to as an IMS Centralized Service Routing Number or "ICSRN." The dialog information contained in the Invite Header or in the body of the Invite may be used to correlate the call.

A suitable timer mechanism may be started (block 314) at the AS node 308 in order to monitor a time-to-live variable associated with the dynamically allocated IMRN. After verifying that the call reference has not timed out based on the UE device's timer mechanism, responsive to receipt of the SIP 380 Response message 316, UE device 302 initiates a call setup message 320 that includes the dynamic IMRN (or ICSRN). In response, MSC 304 generates an Initial Address Message (IAM) 322 towards MGCF 306. A SIP Invite message 324 that contains the IMRN is generated by MGCF 306 towards the AS node 308, which then uses the IMRN mapping for establishing the SIP session or call to the called party (not shown). It is recognized that various intermediate SIP messages and resource allocation/reservation negotiations may take place between MGCF 306 and the called party subsequent to SIP Invite 324, which are not described in particular detail herein. Also, additional ISUP messaging that may take place before a bearer path is established between the UE device 302 and the called party understood by those skilled in the art is not shown herein.

Upon receipt of the dynamically-allocated IMRN via SIP Invite 324 at the AS node 308, the timer mechanism may be stopped (block 326) to verify if the IMRN has timed out. If timed-out, the SIP Invite message may be discarded and the call routing process may be terminated. If the IMRN has not timed out, the AS node 308 may establish the SIP session based on the IMRN correlation. After using the IMRN for correlation, it may be returned to the IMRN pool, wherein a quarantine timer may be started (block 328) such that the IMRN is prohibited from further use until the quarantine timer is stopped after a period of time (block 330).

As pointed out previously, the timer mechanism at the device side may also be used to ensure that the call reference number has not timed out (e.g., using the timer mechanism 318), which reference number is used by the UE device to correlate the information received from the network node (e.g., dynamic IMRN). If the timer expires before the same reference number is received back from the network node, the UE device may reattempt the call process a predetermined number of times (e.g. five attempts), after which if no response has been received, the call procedure may be deemed to have failed. In other words, if the UE device receives a reference number that is no longer valid, it may be discarded and the call procedure may be terminated.

Figure 3B:
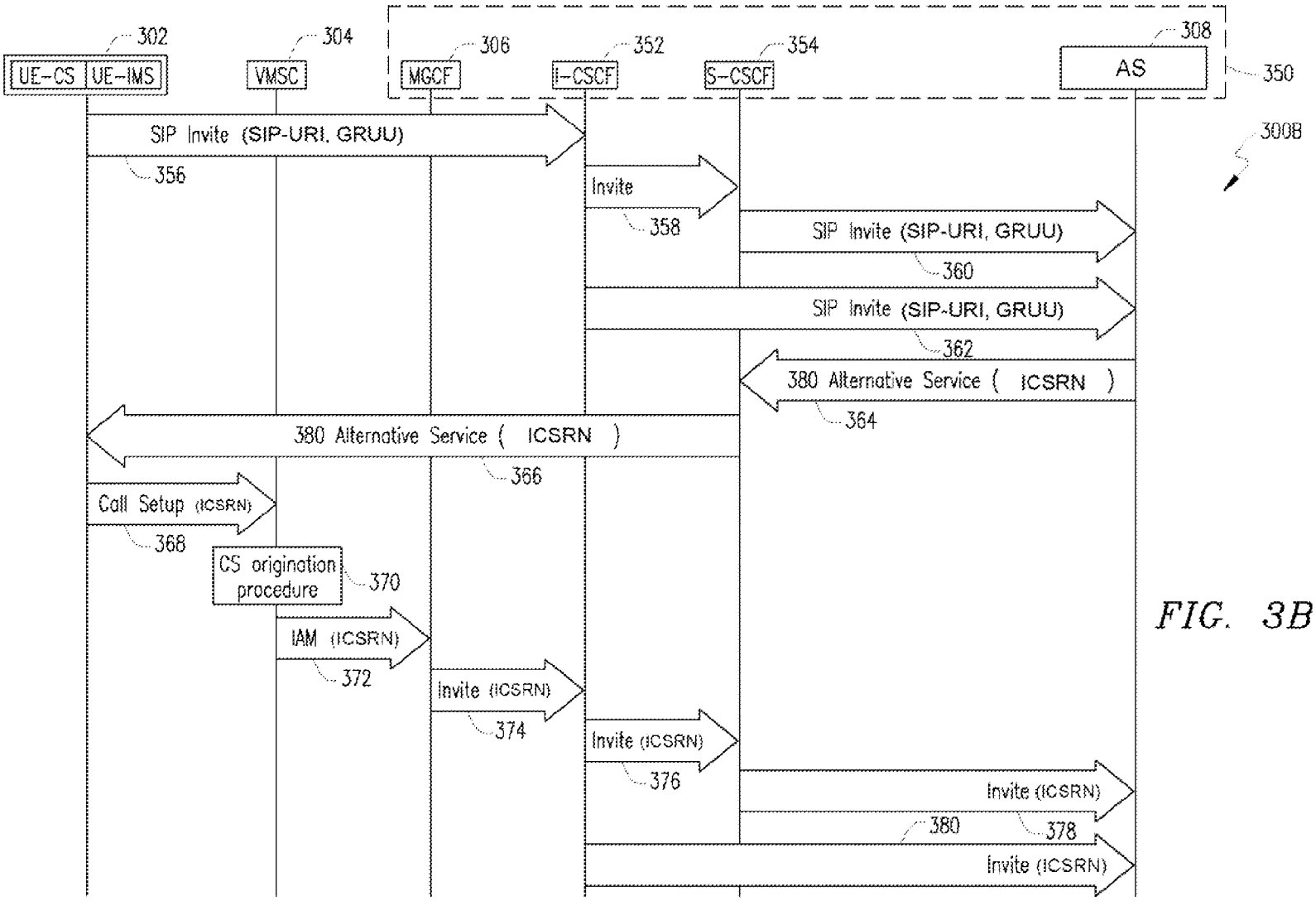

FIG. 3B depicts a message flow diagram 300B for a mobile-originated SIP call by employing a SIP Invite message with a SIP-URI in the Request-URI wherein certain intermediary nodes in a home network 350 are exemplified. Similar to the flow diagram embodiment 300A described above, UE device 302 is operable to generate a SIP Invite message 356 towards I-CSCF 352, wherein the SIP Invite message includes a SIP-URI of the called party contained in the TARGET field. This Invite message is propagated to AS node 308 either directly as SIP Invite 362 or via S-CSCF 354 by way of SIP Invite messages 358 and 360. As described previously, SIP 380 (Alternative Service) Response message 364 having the ICSRN is generated by AS node 308 towards S-CSCF 354, which is then propagated to UE device 302 via SIP response 366. A call setup message 368 having the ICSRN is provided to MSC 304, which initiates a CS origination procedure 370. IAM messaging 372 from MSC 304 towards MGCF 306 is operable to generate SIP Invite 374 towards I-CSCF 352, which may be directly propagated to AS node 308 as Invite message 380 having the ICSRN. Alternatively, I-CSCF 352 first provides a SIP Invite 376 to S-CSCF 354 which then propagates a SIP Invite 378 to AS node 308. Regardless, once the ICSRN is received at the AS node 308, appropriate call correlation is made to establish the SIP call between the UE and the called party.

Note that, in one variation of the technique described in relation to FIGS. 2, 3A, and 3B, the E.164 number is not dynamically allocated but rather merely identified, calculated, or otherwise selected in accordance with any suitable algorithm.

Elaborating on the techniques of the present disclosure in further detail, when the UE device detects that it needs to invoke CS call origination, it may produce and send a SIP Invite message to an R-URI that is known to terminate at the IMS centralized services node. In this case, the Target parameter of the SIP Invite message is populated with the B party address (SIP URI or Tel URI) and the Cause value of the SIP Invite message is set to indicate that the call needs to be set up over CS. Alternatively, the R-URI may be populated with the B-party address, and may further include an indicator in an indicator field that indicates whether the message is for a circuit-switched (CS) mobile-originated (MO) call (i.e. whether UE device 302 intends to make this call via the CS domain). For example, a new Network-Access-Info value such as "GERAN-CS" may be utilized. Alternatively, a new feature tag or new URI parameter may be provided in the SIP Invite message. In the first case, the SIP Invite message contains the GRUU of the UE/Public ID combination. The P-Preferred-ID is set to the calling line identity (CLI) associated with the user or subscriber of the UE device for identification in the CS network. The B-Party Public user address (Tel URI, SIP URI) is set in SIP URI Target parameter, and the cause value indicates CS bearer required=YYY.

Note that when the Target parameter is used to carry the B party address, the SIP R-URI may be one of many that has been provisioned in the UE device to indicate the ICCF. If so, the UE device could choose one of these at random, the URI could have some indicia that identify a priority order.

An example is provided below:

```
INVITE sip:icenetworknode@example.com;\
target=sip:+15555551002%40example.com;user=phone;\
    cause=YYY    SIP/2.0
P-Preferred-Identity: <tel: +1-555-1001>
P-Access-Network-Info: 3GPP-GERAN;
Privacy: none
From:Alice
<sip:+15551001@example.com;user=phone>;tag=9fxced76sl
Supported: gruu
To: sip:+15555551002@example.com;user=phone
Call-ID: c3x842276298220188511
CSeq: 1 INVITE
Max-Forwards: 70
Contact: <sip:alice@192.0.2.1>
;+sip.instance="<urn:uuid:f81d4fae-7dec-11d0-a765-
00a0c91e6bf6>"
Content-Type: application/sdp
Content-Length: *Body length goes here*
```

If the R-URI is set to the B-party, the invite shall contain the GRUU of the UE/Public ID combination. The P-Preferred-ID shall be set to the calling line identity that the user wants to be known as in the CS network. The Network-Access-Info header shall be set to a value to indicate that the call is SIP controlled, but the radio bearer goes over the CS domain, in this example the setting is 3GPP-GERAN-CS, another example could be 3GPP-UTRAN-CS.

An example is provided below:

```
INVITE sip: sip:+15555551002%40example.com;user=phone;\
    SIP/2.0
P-Preferred-Identity: <tel: +1-555-1001>
P-Access-Network-Info: 3GPP-GERAN-CS;
Privacy: none
From:Alice
<sip:+15551001@example.com;user=phone>;tag=9fxced76sl
Supported: gruu
To: sip:+15555551002@example.com;user=phone
Call-ID: c3x842276298220188511
CSeq: 1 INVITE
Max-Forwards: 70
```

-continued

```
Contact: <sip:alice@192.0.2.1>
;+sip.instance="<urn:uuid:f81d4fae-7dec-11d0-a765-
00a0c91e6bf6>"
Content-Type: application/sdp
Content-Length: *Body length goes here*
```

Upon receipt of a 380 (Alternative Service) response to the SIP Invite message, the UE shall use the ICSRN that was provided in the 380 (Alternative Service) response as the E.164 number to set up a CS call to. This E.164 number shall be in the contact header of the 380 (Alternative Service) or in fact it could be in the XML body.

Upon receipt of the R-URI, the S-SCSF recognizes that the Invite is for the IMS centralized services node that has been assigned to the UE and forwards it to the this AS node. IMS centralized service node configuration information includes (a) the ICSRN E.164 start address number; and (b) number of ICSRN to be allocated or the last E.164 start address number. To allow for flexibility in numbering plan, there maybe more occurrences of (a) and (b) allowing pools of ICSRN to be allocated from different number ranges. In addition to (a) and (b), other configuration information may include (c) life time an ICSRN can live for; and (d) quarantine time of an ICSRN—how long after an ICSRN has been assigned back to the ICSRN pool it cannot be used for.

Behavior at the IMS centralized service node is discussed. If the IMS centralized services node receives an Invite that contains an R-URI is shall examine that R-URI to determine if that R-URI is associated with a request to initiate a MO call over CS. An alternative implementation is that the IMS centralized services node will examine the P-Access-Network-Info header. If it is set to GERAN-CS or some other value to indicate call-set-up over CS, the IMS centralized services node shall assume the received Invite shall be terminated here and the behavior as follows shall take place.

The IMS centralized services node will assign a ICSRN to the received GRUU. The following represents a possible mapping of the ICSRN to the other information elements.

```
ICSRN --
    GRUU
    P-Asserted ID(s)
    B-Number (SIP URI or Tel URI)
```

The IMS centralized services node will respond to the INVITE request with a 380 (Alternative Service) response. An example of coding of this response can be found below, which shall include the ICSRN, the Radio Access type that the handover shall be made to that includes (but is not limited to) "IEEE-802.11"/"IEEE-802.11a"/"IEEE-802.11b"/"IEEE-802.11g"/"3GPP-GERAN"/"3GPP-UTRAN-FDD"/"3GPP-UTRAN-TDD"/"ADSL"/"ADSL2"/"ADSL2+"/"RADSL"/"SDSL"/"HDSL"/"HDSL2"/"G.SHDSL"/"VDSL"/"IDSL"/"3GPP2-1X"/"3GPP2-1X-HRPD"/"DOCSIS"/token, 3GPP-GERAN CS, 3GPP-GERAN PS, 3GPP-UTRAN CS, 3GPP-UTRAN PS, 802.11b, 802.11a, 802.11g, EVDO, CDMA1X, WiMAX, etc. The ICSRN is also contained in the Contact Header. It will start a timer against the allocation of the ICSRN that will be cancelled on receipt of an Invite that origination was from a MGCF with the ICSRN as the R-URI. If the timer expires the ICSRN shall be put into a quarantine pool.

If the IMS centralized services node receives a subsequent request from the same UE, identified by the GRUU in the Invite, the IMS centralized services node may do the following: (a) Resend the same ICSRN and reset the timer; (b) Allocate a new ICSRN, start a timer associated with that ICSRN and put the old put into the quarantine pool; and (c) Reject the request altogether and put the old put into the quarantine pool.

The following is exemplary code for coding a 380 Alternative Service Response:

```
<!ELEMENT ICSRN EMPTY>
<!ATTLIST ICSRN
  TYPE (SIP_URI | Tel_URI)          #REQUIRED
>
<!ELEMENT RAT EMPTY>
<!ATTLIST RAT
 TYPE (IEEE-802.11 | IEEE-802.11a | IEEE-802.11b | IEEE-
802.11g | 3GPP-GERAN | 3GPP-UTRAN-FDD | 3GPP-UTRAN-TDD |
ADSL | ADSL2 | ADSL2+ | RADSL | SDSL | HDSL | HDSL2 |
G.SHDSL | VDSL | IDSL | 3GPP2-1X | 3GPP2-1X-HRPD | DOCSIS |
token| 3GPP -GERAN CS | 3GPP -GERAN PS | 3GPP-UTRAN CS |
3GPP-UTRAN PS | EVDO | CDMA1X | WiMAX) #REQUIRED
>
Or
<!ELEMENT AT EMPTY>
<!ATTLIST AT
 TYPE (IEEE-802.11 | IEEE-802.11a | IEEE-802.11b \ IEEE-
802.11g | 3GPP-GERAN | 3GPP-UTRAN-FDD | 3GPP-UTRAN-TDD |
ADSL | ADSL2 | ADSL2+ | RADSL | SDSL | HDSL | HDSL2 |
G.SHDSL | VDSL | IDSL | 3GPP2-1X | 3GPP2-1X-HRPD | DOCSIS |
token | 3GPP -GERAN CS | 3GPP -GERAN PS | 3GPP-UTRAN CS |
3GPP-UTRAN PS | EVDO | CDMA1X | WiMAX) #REQUIRED
>
<?xml version="1.0"?>
<!-- Draft DTD for the IMS XML body. -->
<!DOCTYPE ims-3gpp [
    <!-- ims-3gpp element: root element -->
    <!ELEMENT ims-3gpp (alternative-service?, service-
info?)>
    <!ATTLIST ims-3gpp version CDATA #REQUIRED>
    <!-- service-info element: The transparent data
received from HSS for AS -->
    <!ELEMENT service-info                (#PCDATA)>
    <!-- alternative-service: alternative-service used in
emergency sessions -->
    <!ELEMENT alternative-service       (type, reason)>
    <!ELEMENT type                     (emergency | vcc-
domain-tx, MO call)>
    <!ELEMENT reason                    (#PCDATA)>
<!ELEMENT vcc-domain-tx (uri?, access-type?, domain-type?)
<!ELEMENT uri (#PCDATA)>
<!ELEMENT access-type EMPTY>
<!ATTLIST access-type
 access-technology (IEEE-802.11 | IEEE-802.11a | IEEE-
802.11b | IEEE-802.11g | 3GPP-GERAN | 3GPP-UTRAN-FDD | 3GPP-
UTRAN-TDD | ADSL | ADSL2 | ADSL2+ | RADSL | SDSL | HDSL |
HDSL2 | G.SHDSL | VDSL | IDSL | 3GPP2-1X | 3GPP2-1X-HRPD |
DOCSIS | token| 3GPP -GERAN CS | 3GPP -GERAN PS |
3GPP-UTRAN CS | 3GPP-UTRAN PS | EVDO |CDMA1X | WiMAX)
#REQUIRED
>
<!ELEMENT domain-type EMPTY>
<!ATTLIST domain-type
 domain (IMS | CS) #IMPLIED
>
]>
<vcc-domain-tx>
    <uri>tel:ffff</uri>
    <access-type access-technology="IEEE-802.11"/>
    <domain-type domain="IMS"/>
</vcc-domain-tx>
END
```

Figure 4:
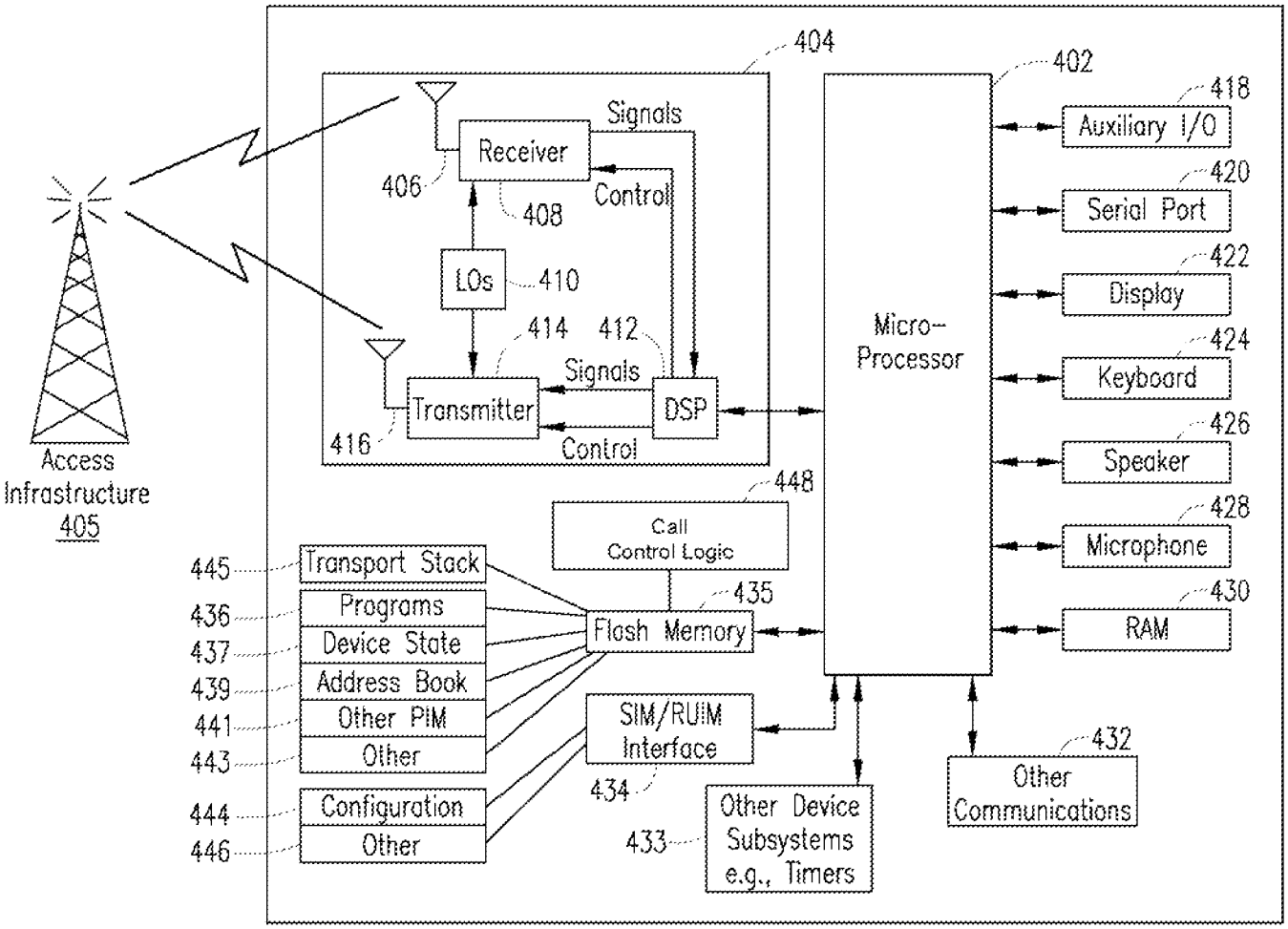
FIG. 4 depicts a block diagram of an embodiment of a communications device operable for purposes of the present patent disclosure.

FIG. 4 depicts a block diagram of an embodiment of a mobile communication device operable as a wireless UE device, e.g., UE 302, for purposes of the present patent disclosure. It will be recognized by those skilled in the art upon reference hereto that although an embodiment of UE 302 may comprise an arrangement similar to one shown in FIG. 4, there can be a number of variations and modifications, in hardware, software or firmware, with respect to the various modules depicted. Accordingly, the arrangement of FIG. 4 should be taken as illustrative rather than limiting with respect to the embodiments of the present patent disclosure. A microprocessor 402 providing for the overall control of an embodiment of UE 302 is operably coupled to a communication subsystem 404 that is capable of multi-mode communications (e.g., CS domain, IP domain such as IMS, et cetera). The communication subsystem 404 generally includes one or more receivers 408 and one or more transmitters 414 as well as associated components such as one or more local oscillator (LO) modules 410 and a processing module such as a digital signal processor (DSP) 412. As will be apparent to those skilled in the field of communications, the particular design of the communication module 404 may be dependent upon the communications networks with which the mobile device is intended to operate (e.g., a CDMA network, a GSM network, WLAN, et cetera). Regardless of the particular design, however, signals received by antenna 406 through appropriate access infrastructure 405 (e.g., cellular base station towers, WLAN hot spots, etc.) are provided to receiver 408, which may perform such common receiver functions as signal amplification, frequency down conversion, filtering, channel selection, analog-to-digital (A/D) conversion, and the like. Similarly, signals to be transmitted are processed, including modulation and encoding, for example, by DSP 412, and provided to transmitter 414 for digital-to-analog (D/A) conversion, frequency up conversion, filtering, amplification and transmission over the air-radio interface via antenna 416.

Microprocessor 402 may also interface with further device subsystems such as auxiliary input/output (I/O) 418, serial port 420, display 422, keyboard/keypad 424, speaker 426, microphone 428, random access memory (RAM) 430, a short-range communications subsystem 432, and any other device subsystems, e.g., timer mechanisms, generally labeled as reference numeral 433. In this example, display 422, keyboard/keypad 424, speaker 426, microphone 428 are part of the user interface of the mobile communication device through which calls may be initiated by and maintained for the end user. To control access, a SIM/RUIM 434 may also be provided in communication with the microprocessor 402. In one implementation, SIM/RUIM interface 434 is operable with a SIM/RUIM card having a number of key configurations 444 and other information 446 such as URIs as well as identification and subscriber-related data. Note that, without a SIM/RUIM, the UE device is referred to as mobile equipment (ME) but techniques of the present disclosure are applicable to either device.

Operating system software and applicable service logic software may be embodied in a persistent storage module (i.e., non-volatile storage) such as Flash memory 435. In one implementation, Flash memory 435 may be segregated into different areas, e.g., storage area for computer programs 436 (e.g., service processing logic), as well as data storage regions such as device state 437, address book 439, other personal information manager (PIM) data 441, and other data storage areas generally labeled as reference numeral 443. A transport stack 445 may be provided to effectuate one or more appropriate radio-packet transport protocols. In addition, a call control logic module 448 is provided for appropriate call message processing according to the present techniques, effectuating SIP-URI and call reference ID generation, validation, verification, and correlation with IMRNs, etc. as set forth hereinabove.

Thus, methods and apparatus for originating a Session Initiation Protocol (SIP) call from a user equipment (UE) device in a network environment including a circuit-switched (CS) network and an IP multimedia subsystem (IMS) network to a called party have been described. When the SIP call is originated from the UE device in the CS network domain, a SIP Invite message which includes a SIP Uniform Resource Indicator (URI) or Tele URI of the called party is sent from the UE device to an application server (AS) node in the IMS network. At the AS node, a pool of E.164 numbers are maintained as IP multimedia routing numbers (IMRNs) which are utilized for mapping to or otherwise associating with called party URIs. Thus, the AS node dynamically allocates a select E.164 number with respect to the called party's URI received from the UE device, and returns it to the UE device in a SIP 380 (Alternative Service) Response message. Subsequently, the dynamically-allocated E.164 number is sent from the UE device in a call setup message for identification of the URI at the AS node. Thus, the dynamically-allocated E.164 number is utilized for routing the SIP call towards the called party upon interrogating the URI—IMRN mapping, whereupon it may be released back to the pool of IMRNs for future use. Appropriate timers may be provided at the device and AS node endpoints so that it can be verified whether a call reference number associated with the call remains valid (e.g. it has not timed out) or the dynamically-allocated IMRN remains valid (e.g. it has not timed out). Optionally, the released IMRN may be quarantined for a period of time.

At the AS node, the technique may include the acts of maintaining access to a pool of E.164 numbers as IP multimedia routing numbers (IMRNs); receiving a SIP Invite message for a SIP call originating from a user equipment (UE) device through a circuit-switched network domain, the SIP Invite message having call information which includes a SIP URI or Tel URI of the called party; selecting one of the E.164 numbers and storing a mapping between the selected E.164 number and the call information; causing a SIP 380 (Alternative Service) Response message to be sent to the UE device in response to receiving the SIP Invite message, the SIP 380 (Alternative Service) message including the selected E.164 number; and after the sending of the SIP 380 (Alternative Service) Response message, receiving a call setup message from the UE device for the SIP call, the call setup message having the selected E.164 number; identifying, with use of the selected E.164 number via the stored mapping, the URI identified from the call setup message; and causing a SIP session to be established with the called party with use of the URI identified via the stored mapping.

It is believed that the operation and construction of the embodiments of the present patent application will be apparent from the Detailed Description set forth above. While the exemplary embodiments shown and described may have been characterized as being preferred, it should be readily understood that various changes and modifications could be made therein without departing from the scope of the present disclosure as set forth in the following claims.

What is claimed is:

1. A method for an application server (AS) node, the method comprising:

receiving a first SIP Invite request from a mobile communication device, the first SIP Invite request having call information which includes a call reference number, a uniform resource indicator (URI) of a called party and data used for determining whether the first SIP Invite request is for a bearer over a circuit-switched (CS) network;

associating an E.164 number with the call information in the first SIP Invite request;

sending a SIP *alternative service* response to the mobile communication device in response to receiving the first SIP Invite request, the SIP *alternative service* response including the E.164 number and the call reference number;

after sending the SIP *alternative service* response, receiving a call setup message from the CS network, the call setup message having the E.164 number;

verifying that the received E.164 number remains valid;

identifying the call information based on the E.164 number; and sending, to the called party, a second SIP Invite request that includes [the call information] *a second call information*.

2. The method of claim 1, further comprising:

identifying the URI of the called party in a TARGET field of the first SIP Invite request.

3. The method of claim 1, wherein a URI field of the first SIP Invite request is populated with a public service identifier (PSI) of the AS node of an Internet Protocol (IP) multimedia subsystem (IMS) network.

4. The method of claim 1, further comprising:

reading the data; and determining, based on the data, that the first SIP Invite request is for the bearer over the CS network.

5. The method of claim 1, wherein the call setup message is another SIP Invite request.

6. An application server (AS) node comprising:

a processor configured to:

receive a first SIP Invite request from a mobile communication device, the first SIP Invite request having call information which includes a call reference number, a uniform resource indicator (URI) of a called party and data used for determining whether the first SIP Invite request is for a bearer over a circuit-switched (CS) network;

[associating] *associate* an E.164 number with the call information in the first SIP Invite request;

send a SIP *alternative service* response to the mobile communication device in response to receiving the first SIP Invite request, the SIP *alternative service* response including the E.164 number and the call reference number;

after sending the SIP *alternative service* response, receive a call setup message from the CS network, the call setup message having the E.164 number;

verify that the received E.164 number remains valid;

identify the call information based on the E.164 number; and send, to the called party, a second SIP Invite request that includes [the call information] *a second call information*.

7. The AS node of claim 6, wherein the processor is further configured to identify the URI of the called party in a TARGET field of the first SIP Invite request.

8. The AS node of claim 6, wherein the processor is further configured to select the E.164 number by allocating the E.164 number from a plurality of E.164 numbers.

9. The AS node of claim 6, wherein the processor is further configured to:

read the data; and determine, based on the data, that the first SIP Invite request is for the bearer over the CS network.

10. The AS node of claim 6, wherein the call setup message is another SIP Invite message.

*11. The method of claim 1, wherein the second call information comprises a second call reference number.*

*12. The method of claim 1, wherein the second call information comprises a second uniform resource indicator (URI).*

*13. The method of claim 12, wherein the URI in the first SIP Invite is a first URI and the second URI is the first URI.*

*14. The AS node of claim 6, wherein the second call information comprises a second call reference number.*

*15. The AS node of claim 6, wherein the second call information comprises a second uniform resource indicator (URI).*

*16. The AS node of claim 15, wherein the URI in the first SIP Invite is a first URI and the second URI is the first URI.*

* * * * *